(12) United States Patent
Segawa et al.

(10) Patent No.: US 12,540,658 B2
(45) Date of Patent: Feb. 3, 2026

(54) BALL SCREW DEVICE AND METHOD FOR MANUFACTURING SAME

(71) Applicant: NSK LTD., Tokyo (JP)

(72) Inventors: Ryo Segawa, Fujisawa (JP); Yuta Nakabayashi, Fujisawa (JP)

(73) Assignee: NSK LTD., Tokyo (JP)

( * ) Notice: Subject to any disclaimer, the term of this patent is extended or adjusted under 35 U.S.C. 154(b) by 37 days.

(21) Appl. No.: 18/682,598

(22) PCT Filed: May 11, 2023

(86) PCT No.: PCT/JP2023/017692
§ 371 (c)(1),
(2) Date: Feb. 9, 2024

(87) PCT Pub. No.: WO2023/223930
PCT Pub. Date: Nov. 23, 2023

(65) Prior Publication Data
US 2024/0352993 A1  Oct. 24, 2024

(30) Foreign Application Priority Data

May 16, 2022 (JP) .................. 2022-079935
Oct. 6, 2022 (JP) .................. 2022-161397

(51) Int. Cl.
*F16H 25/20* (2006.01)
*F16D 1/10* (2006.01)
*F16H 25/24* (2006.01)

(52) U.S. Cl.
CPC ............... *F16H 25/20* (2013.01); *F16D 1/10* (2013.01); *F16D 2001/103* (2013.01);
(Continued)

(58) Field of Classification Search
CPC ............. F16H 25/20; F16H 2025/2075; F16H 2025/2087; F16H 2025/2481; F16D 1/10; F16D 2001/103
See application file for complete search history.

(56) References Cited

U.S. PATENT DOCUMENTS

2007/0199556 A1 * 8/2007 Murai .................. B23K 11/315
126/20
2013/0074621 A1 * 3/2013 Ueno ....................... B62D 3/12
74/30
(Continued)

FOREIGN PATENT DOCUMENTS

EP  2103451 B1 *  3/2016  ......... B60B 27/0005
JP  3-057551 U     6/1991
(Continued)

OTHER PUBLICATIONS

International Search Report for PCT/JP2023/017692 dated Jul. 18, 2023.

*Primary Examiner* — Zakaria Elahmadi
(74) *Attorney, Agent, or Firm* — Sughrue Mion, PLLC

(57) ABSTRACT

A fitting shaft portion has an inner-diameter side engaging portion on an outer peripheral surface with external teeth arranged in a circumferential direction; a fitting member has an outer-diameter side engaging portion on an inner peripheral surface with internal teeth arranged in the circumferential direction and engaging with the inner-diameter side engaging portion; an engaging portion between the inner-diameter side engaging portion and the outer-diameter side engaging portion includes a portion having interference in the radial direction in a portion in the axial direction; and the fitting shaft portion has a crimped portion at an end portion on one side in the axial direction that engages in the axial direction with the fitting member.

14 Claims, 23 Drawing Sheets

(52) U.S. Cl.
CPC ............... *F16H 2025/2075* (2013.01); *F16H 2025/2087* (2013.01); *F16H 2025/2481* (2013.01)

(56) References Cited

U.S. PATENT DOCUMENTS

2017/0130776 A1\* 5/2017 Uhrick ..................... F16D 1/10
2020/0049236 A1\* 2/2020 Shimizu ................. F16H 37/12

FOREIGN PATENT DOCUMENTS

| | | | | |
|---|---|---|---|---|
| JP | 2009-286137 A | | 12/2009 | |
| JP | 2010163051 A | \* | 7/2010 | .......... F16C 35/0635 |
| JP | 2011-131641 A | | 7/2011 | |
| JP | 2021-129384 A | | 9/2021 | |
| WO | 2021161688 A1 | | 8/2021 | |

\* cited by examiner

FIG.7A
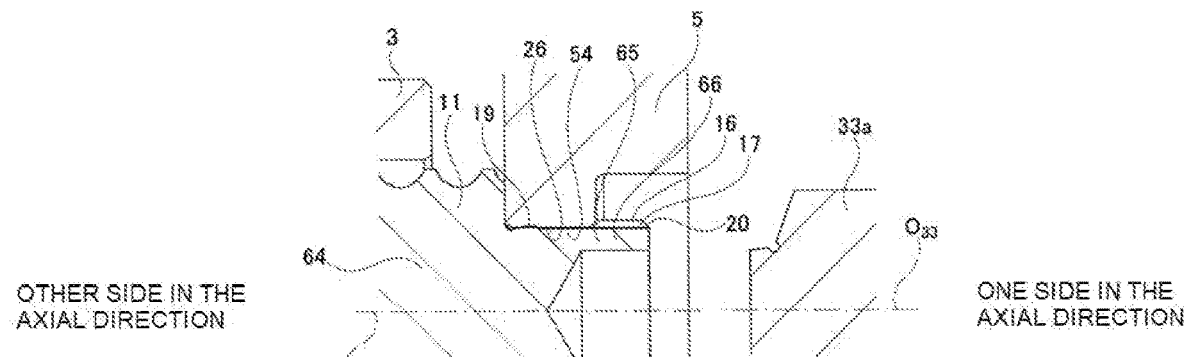
OTHER SIDE IN THE AXIAL DIRECTION
ONE SIDE IN THE AXIAL DIRECTION
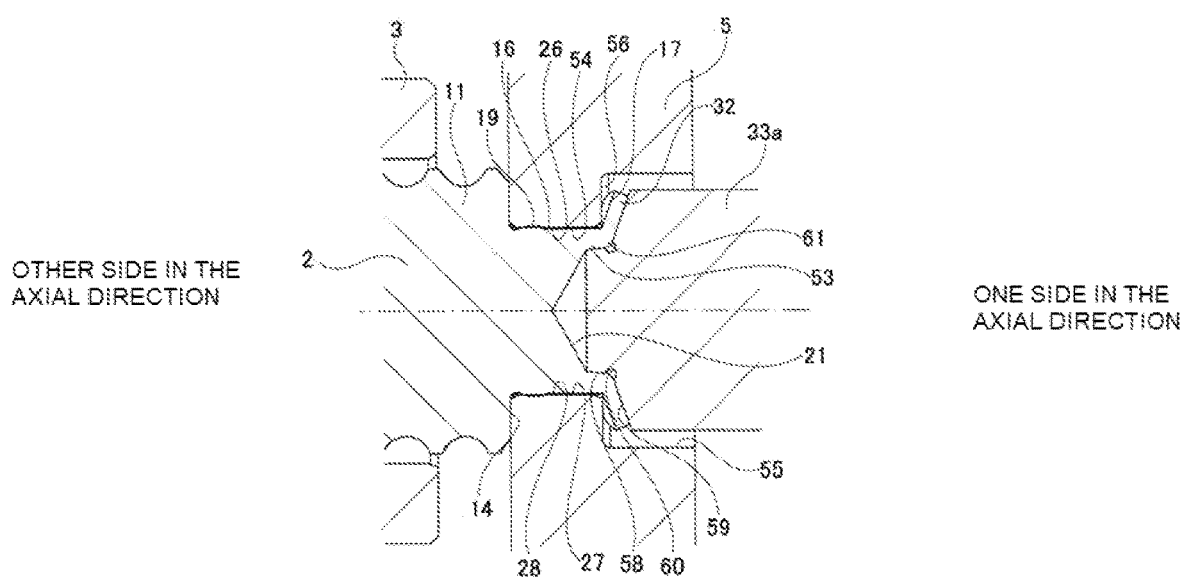
OTHER SIDE IN THE AXIAL DIRECTION
ONE SIDE IN THE AXIAL DIRECTION
FIG.7B

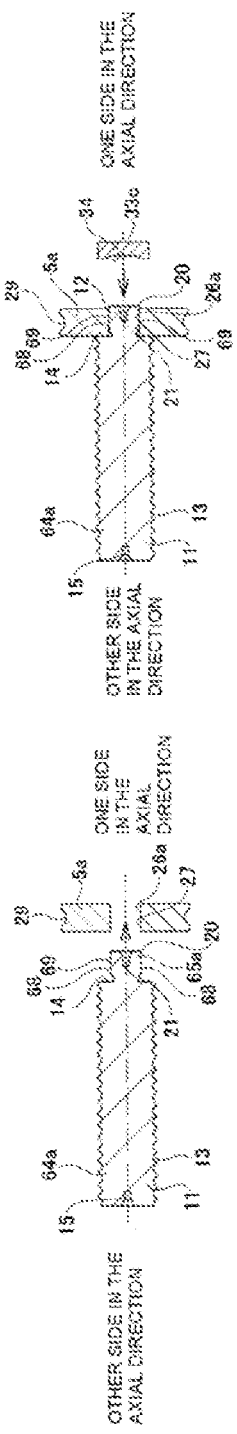
FIG. 14A
FIG. 14B
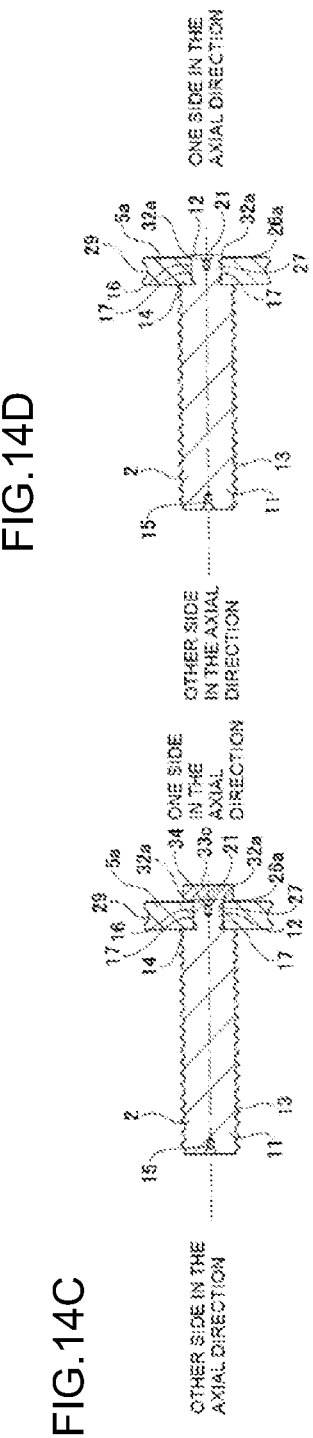
FIG. 14C
FIG. 14D

OTHER SIDE IN THE AXIAL DIRECTION

ONE SIDE IN THE AXIAL DIRECTION

BALL SCREW DEVICE AND METHOD FOR MANUFACTURING SAME

CROSS REFERENCE TO RELATED APPLICATIONS

This application is a National Stage of International Application No. PCT/JP2023/017692 filed May 11, 2023, claiming priority based on Japanese Patent Application No. 2022-079935 filed May 16, 2022 and Japanese Patent Application No. 2022-161397 filed Oct. 6, 2022.

TECHNICAL FIELD

The present disclosure relates to a ball screw device and a manufacturing method thereof.

BACKGROUND ART

A ball screw device causes balls to roll between a screw shaft and a nut, and thus is able to achieve higher efficiency than a sliding screw device that brings the screw shaft and nut into direct contact. For this reason, ball screw devices are incorporated in various mechanical devices such as electric brake devices of automobiles, automatic manual transmissions (AMT), and positioning devices of machine tools, in order to convert a rotational motion of a drive source such as an electric motor into linear motion.

A ball screw device includes of a screw shaft having a spiral shaft-side ball screw groove on the outer peripheral surface, a nut having a spiral nut-side ball screw groove on the inner peripheral surface, and a plurality of balls arranged between the shaft-side ball screw groove and the nut-side ball screw groove. In a ball screw device, one of the screw shaft and the nut functions as a rotary motion element, and the other functions as a linear motion element, depending on the application.

FIG. 23 illustrates a ball screw device 100 with a conventional structure, as described in JP 2009-286137 A.

The screw shaft 101 of the ball screw device 100 has a thread portion 103 and a fitting shaft portion 104 arranged on one side in the axial direction of the thread portion 103. A shaft-side ball screw groove 105 is formed on an outer peripheral surface of the thread portion 103. The fitting shaft portion 104 has a smaller outer diameter than the thread portion 103. The screw shaft 101 is arranged coaxially with the nut 102 in a state in which the thread portion 103 is inserted inside the nut 102.

A nut-side ball screw groove (not illustrated) is formed on an inner peripheral surface of the nut 102. The nut 102 engages with a plurality of guide rods 107 supported by a housing 106 to prevent rotation thereof.

The shaft-side ball screw groove 105 and the nut-side ball screw groove are arranged to face each other in a radial direction, and form a spiral load path. The starting point and ending point of the load path are connected by a circulation means (not illustrated). The balls that have reached the ending point of the load path are returned to the starting point of the load path through the circulation means. The starting point and ending point of the load path are switched depending on the direction of relative displacement (relative rotation direction) between the screw shaft 101 and the nut 102 in the axial direction.

The rotation of an electric motor 108, which is a drive source, is decelerated by a pulley device 109 and transmitted to the screw shaft 101 through the fitting shaft portion 104. Therefore, a driven pulley 110 is fitted onto the fitting shaft portion 104 in a relatively non-rotatable manner, a drive pulley 112 is fitted on a tip-end portion of the motor shaft 111 of the electric motor 108 in a relatively non-rotatable manner, and a belt 113 is stretched between the driven pulley 110 and the driven pulley 110.

CITATION LIST

Patent Literature

Patent Literature 1: JP 2009-286137 A

SUMMARY OF INVENTION

Technical Problem

Measures are taken to prevent the fitting shaft portion of the screw shaft from coming out in the axial direction from a fitting member such as a pulley or gear for rotationally driving the screw shaft, which is externally fitted onto the fitting shaft portion. As such a measure, forming a crimped portion at a tip-end portion of the fitting shaft portion has been considered.

However, depending on how the ball screw device will be used, a pullout force not only acts on the screw shaft or the fitting member in a direction parallel to a center axis, but also a moment about an axis perpendicular to the center axis may act on the screw shaft or the fitting member. When such a moment acts, the center axis of the fitting shaft portion and the center axis of the fitting member are tilted, and simply forming a crimped portion may cause the fitting shaft portion to come out in the axial direction from the fitting member.

An object of a technique according to present disclosure is to provide a ball screw device capable of effectively preventing the fitting shaft portion of the screw shaft from coming out in the axial direction from the fitting member, even when a moment about an axis perpendicular to the center axis acts on the screw shaft or the fitting member

Solution to Problem

The ball screw device according to one aspect of the present disclosure includes a screw shaft, a nut, a plurality of balls, and a fitting member.

The screw shaft has a thread portion having a spiral shaft-side ball screw groove on an outer peripheral surface thereof, and a fitting shaft portion arranged on one side in an axial direction of the thread portion.

The nut has a spiral nut-side ball screw groove on an inner peripheral surface thereof.

The plurality of balls are arranged between the shaft-side ball screw groove and the nut-side ball screw groove.

The fitting member is externally fitted onto the fitting shaft portion such that rotation relative to the fitting shaft portion is not possible.

Particularly, in the ball screw device according to one aspect of the present disclosure, the fitting shaft portion has an inner-diameter side engaging portion on an outer peripheral surface thereof in which a plurality of external teeth are arranged in a circumferential direction.

The fitting member has an outer-diameter side engaging portion with a plurality of internal teeth arranged in the circumferential direction on an inner peripheral surface thereof, and that engages with the inner-diameter side engaging portion.

An engaging portion between the inner-diameter side engaging portion and the outer-diameter side engaging portion includes a portion having interference in a radial direction in a portion in the axial direction.

The fitting shaft portion has a crimped portion at an end portion on the one side in the axial direction that engages in the axial direction with the fitting member.

In the ball screw device according to one aspect of the present disclosure, the fitting shaft portion includes a center hole that is open at an end surface on the one side in the axial direction, and a cylindrical portion that exists at an outer side in the radial direction of the center hole; and the crimped portion may be provided at an end portion on the one side in the axial direction of the cylindrical portion, and may be pressed against a side surface on the one side in the axial direction of the fitting member.

The center hole may have a bottom surface facing the one side in the axial direction.

An outer peripheral surface of the cylindrical portion may be pressed against the inner peripheral surface of the fitting member.

The crimped portion may be inclined in a direction toward the one side in the axial direction as going toward the outer side in the radial direction.

The crimped portion may be provided around an entire circumference of the end portion on the one side in the axial direction of the fitting shaft portion. In this case, the crimped portion is configured in continuous annular shape in the circumferential direction.

However, the crimped portion may also be configured by a plurality of crimped portions arranged at a plurality of locations in the circumferential direction at the end portion of the one axial side of the fitting shaft portion. In this case, it is preferable that the plurality of crimped portions are arranged at equal intervals.

In the ball screw device according to one aspect of the present disclosure, the crimped portion may be provided at an end portion on the one side in the axial direction of at least one external tooth of the plurality of external teeth, and may engage in the axial direction with an inner peripheral edge portion on the one side in the axial direction of the fitting member.

The crimped portion is configured by a plurality of crimped portions arranged at a plurality of locations in the circumferential direction. The plurality of crimped portions are preferably arranged at equal intervals in the circumferential direction.

Alternatively, the crimped portion may be configured by one crimped portion.

In the ball screw device according to one aspect of the present disclosure, the portion having interference in the radial direction may be arranged at a position of the engaging portion that is separated from the crimped portion toward the other side in the axial direction.

The portion having interference in the radial direction may be arranged at a position distant from the crimped portion toward the other side in the axial direction. Alternatively, the portion having interference in the radial direction may be arranged at a position adjacent to the other side in the axial direction of the crimped portion.

In the ball screw device according to one aspect of the present disclosure, the plurality of external teeth may have a portion in the axial direction, the tooth root circle diameter of which is larger than the tooth root circle diameter of the other portion, or may have a portion in the axial direction, the tooth tip circle diameter of which is larger than the tooth tip circle diameter of the other portion.

In the ball according to one aspect of the present disclosure, the plurality of internal teeth may have a portion in the axial direction, the tooth root circle diameter of which is smaller than the tooth root circle diameter of the other portion, or may have a portion in the axial direction, the tooth tip circle diameter of which is smaller than the tooth tip circle diameter of the other portion.

In the ball screw device according to one aspect of the present disclosure, the fitting member may have a symmetrical shape with respect to the axial direction.

In the ball screw device according to one aspect of the present disclosure, the fitting member may be configured by a driving member for rotationally driving the screw shaft. The driving member may be configured by a carrier of a planetary reduction mechanism, a gear, a motor output shaft, a pulley, or a sprocket.

Alternatively, the fitting member may be configured by a stopper that engages in the circumferential direction with the nut and prevents relative rotation between the nut and the screw shaft. Furthermore, the fitting member may be configured by a rotation prevention member that prevents rotation of the screw shaft.

A manufacturing method of a ball screw device according to one aspect of the present disclosure relates to a manufacturing method of a ball screw device in which the crimped portion is provided at an end portion on the one side in the axial direction of the cylindrical portion.

The manufacturing method of a ball screw device includes steps of:

externally fitting a fitting member to a blank fitting shaft portion of a blank screw shaft: the blank screw shaft including a thread portion with a spiral shaft-side ball screw groove on an outer peripheral surface thereof, and the blank fitting shaft portion arranged on the one side in the axial direction of the thread portion; the blank fitting shaft portion including an inner-diameter side engaging portion provided on an outer peripheral surface of the blank fitting shaft portion and having a plurality of outer teeth arranged in the circumferential direction: a blank center hole open on an end surface of the one side in the axial direction; and a blank cylindrical portion existing on an outer side in the radial direction of the blank center hole; and the fitting member including an outer-diameter side fitting portion provided on an inner peripheral surface of the fitting member, and having a plurality of internal teeth arranged in the circumferential direction, and configured to engage with the inner-diameter side engaging portion; and forming a crimped portion by relatively moving a crimping jig to the other side in the axial direction with respect to the blank screw shaft, and pressing a machining surface provided on an outer peripheral surface of the crimping jig against an inner peripheral surface of the blank cylindrical portion to plastically deform the blank cylindrical portion toward the outer side in the radial direction.

Particularly, in the ball screw device according to one aspect of the present disclosure, the machining surface is configured by a plurality of conical machining surfaces whose generating lines have different inclination angles with respect to the center axis of the crimping jig.

The plurality of machining surfaces may include a first machining surface provided at an end portion on the other side in the axial direction of the outer peripheral surface of the crimping jig, and a second machining surface provided at a portion of the outer peripheral surface of the crimping jig located farther on the one side in the axial direction than the first machining surface. In this case, the inclination angle of the generating line of the second machining surface with respect to the center axis is greater than the inclination angle of the generating line of the first machining surface with respect to the center axis.

The first machining surface and the second machining surface may be connected through a corner R portion or a relief groove portion.

The crimping jig may be moved relative to the blank screw shaft on the other side in the axial direction until an end surface of the other side in the axial direction of the crimping jig abuts against a bottom surface of the blank center hole.

The manufacturing method of a ball screw device according to one aspect of the present disclosure relates to a manufacturing method of a ball screw device in which the crimped portion is provided at an end portion on the one side in the axial direction of at least one external tooth of the plurality of external teeth.

The manufacturing method of a ball screw device includes steps of:

externally fitting a fitting member onto a blank fitting shaft portion of a blank screw shaft: the blank screw shaft including a thread portion with a spiral shaft-side ball screw groove on an outer peripheral surface thereof, and the blank fitting shaft portion arranged on one side in the axial direction of the thread portion: the blank fitting shaft portion including a blank inner-diameter side engaging portion provided on an outer peripheral surface thereof and having a plurality of outer teeth arranged in a circumferential direction thereof; and the fitting member including an outer-diameter side fitting portion provided on an inner peripheral surface thereof, having a plurality of internal teeth arranged in the circumferential direction, and configured to engage with the blank inner-diameter side engaging portion; and forming a crimped portion by relatively displacing a crimping jig to the other side in the axial direction with respect to the blank screw shaft, and pressing a machining surface provided on the crimping jig against an end portion on the one side in the axial direction of at least one blank external tooth of the plurality of blank external teeth to plastically deform the end portion on the one side in the axial direction of the at least one blank external tooth to an outer side in the radial direction and to both sides in the circumferential direction.

Effect of Invention

With the ball screw device of the present example, even in a case where a moment about an axis perpendicular to the center axis acts on the screw shaft or the fitting member, the fitting shaft portion of the screw shaft is effectively prevented from coming out in the axial direction from the fitting member.

BRIEF DESCRIPTION OF DRAWINGS

FIG. 7A and FIG. 7B are diagrams corresponding to FIG. 5A and FIG. 5B regarding a second example of an embodiment according to the present disclosure.

FIG. 14A to FIG. 14D are cross-sectional schematic views for describing a process of using a crimping jig to form a crimped portion at the one side in the axial direction of the fitting shaft portion of the screw shaft in the ball screw device of the forth example.

DESCRIPTION OF THE EMBODIMENTS

First Example

Figure 1:
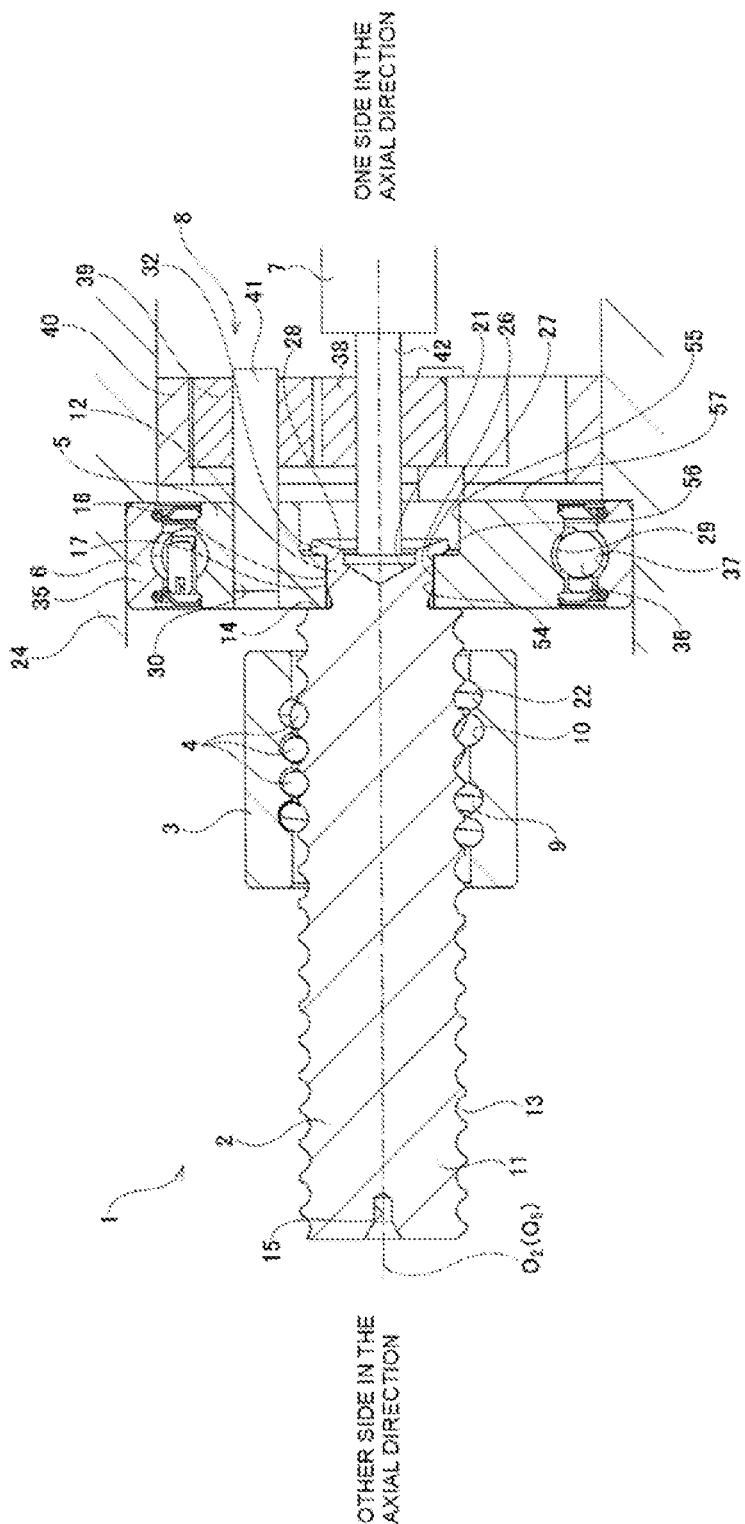
FIG. 1 is a cross-sectional view illustrating a structure in which a planetary reduction mechanism is combined with a ball screw device of a first example of an embodiment according to the present disclosure.
Figure 2:
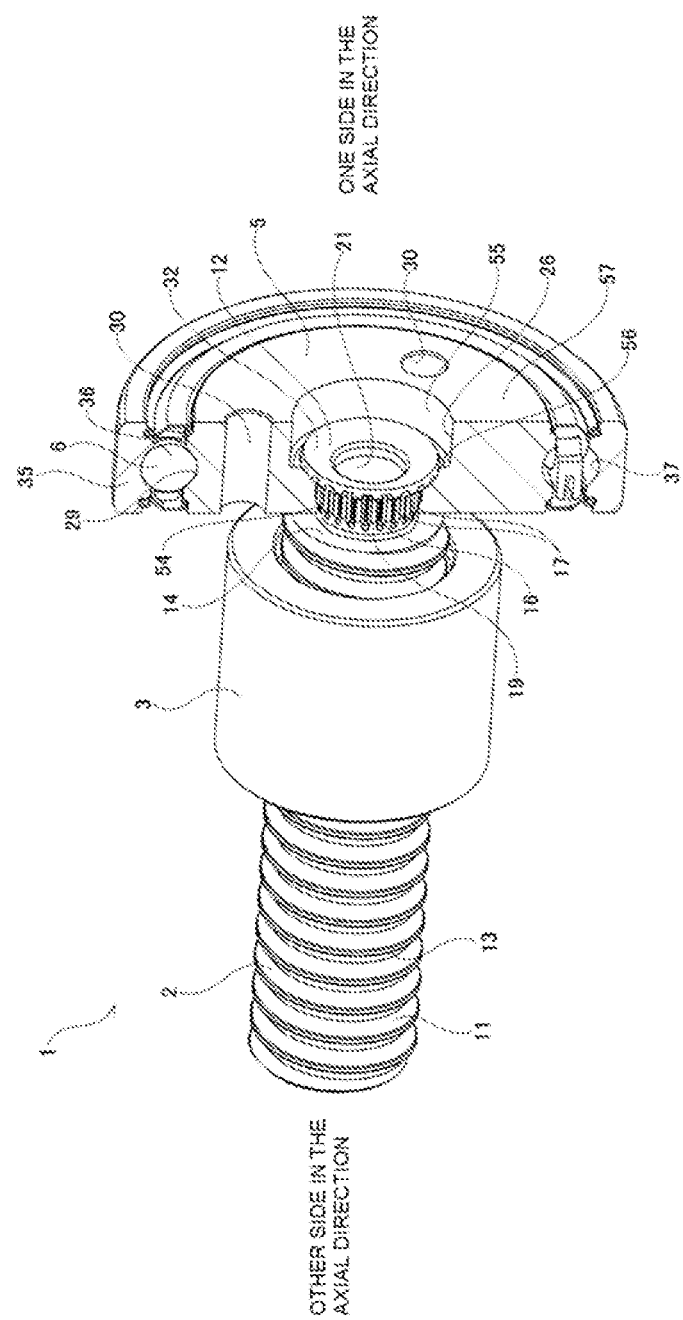
FIG. 2 is a partial cutaway perspective view of the first example of the ball screw device as viewed from outside in the radial direction and one side in the axial direction.
Figure 3:
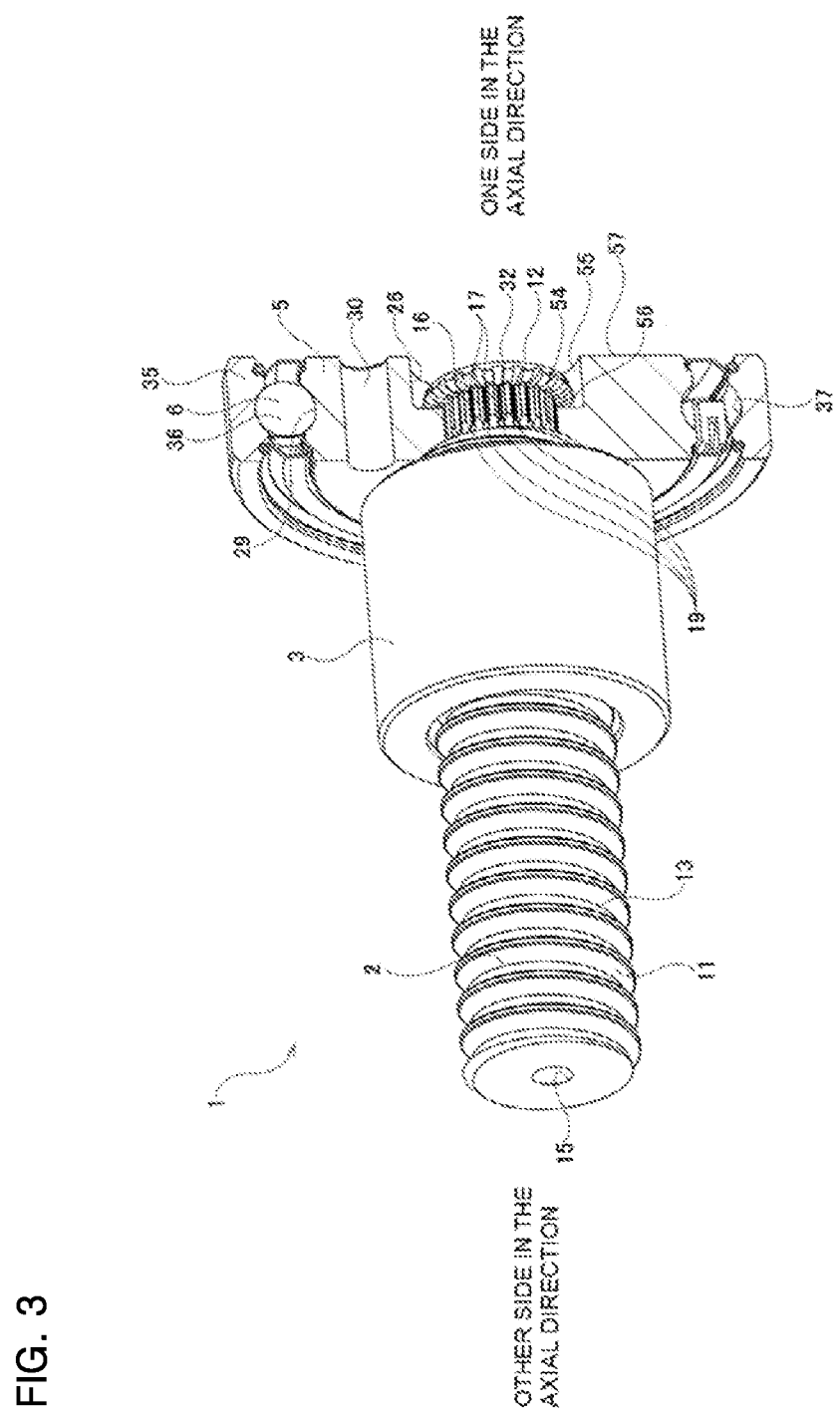
FIG. 3 is a partial cutaway perspective view of the ball screw device of the first example as viewed from the outside in the radial direction and the other side in the axial direction.

A first example of an embodiment according to the present disclosure will be described using FIG. 1 to FIG. 6.
[Overall Configuration of Ball Screw Device]

The ball screw device 1 of this example is used for, but not limited to, applications such as operating a piston of a hydraulic cylinder in an electric brake booster device, for example.

The ball screw device 1 includes: a screw shaft 2; a nut 3; a plurality of balls 4; and a fitting member 5.

The screw shaft 2 is a rotary motion element that is rotationally driven by an electric motor 7 as a drive source through a planetary reduction mechanism 8 and rotates during use. The screw shaft 2 is inserted inside of the nut 3 and is arranged coaxially with the nut 3. The nut 3 is prevented from co-rotation with respect to the screw shaft 2 by a rotation prevention mechanism (not illustrated), and is a linear motion element that moves linearly during use.

A spiral load path 9 is provided between an outer peripheral surface of the screw shaft 2 and an inner peripheral surface of the nut 3. A plurality of balls 4 are arranged in the load path 9 so as to roll. When the screw shaft 2 and the nut 3 are rotated relative to each other, the balls 4 that have reached the ending point of the load path 9 are returned to the starting point of the load path 9 through a circulation groove 10 formed on the inner peripheral surface of the nut 3.

In the following description, the axial direction, radial direction, and circumferential direction refer to the axial direction, radial direction, and circumferential direction with respect to the screw shaft 2 unless otherwise specified. In addition, one side in the axial direction refers to the right side in FIG. 1 to FIG. 5, and the other side in the axial direction refers to the left side in FIG. 1 to FIG. 5.
<Screw Shaft>

The screw shaft 2 is made of metal and includes a thread portion 11 and a fitting shaft portion 12 arranged on the one side in the axial direction of the thread portion 11. The thread portion 11 and the fitting shaft portion 12 are arranged coaxially and are integrally formed with each other. The fitting shaft portion 12 has a smaller outer diameter than the thread portion 11.

The thread portion 11 has a spiral shaft-side ball screw groove 13 on an outer peripheral surface thereof. The shaft-side ball screw groove 13 is formed by performing grinding, cutting, rolling, or the like on the outer peripheral surface of the thread portion 11. In the present example, the number of threads of the shaft-side ball screw groove 13 is one thread, and the groove shape (groove bottom shape) of a cross section of the shaft-side ball screw groove 13 is a gothic arch shape or a circular arc shape.

The thread portion 11 has a ring-shaped abutment surface 14 on a surfacer on the one side in the axial direction. The abutment surface 14 is a flat surface that exists on a virtual plane orthogonal to the center axis of the screw shaft 2. The thread portion 11 has a bottomed first center hole 15 in a center portion in the radial direction of a surface on the other side in the axial direction.

The fitting shaft portion 12 has a dimension in the axial direction that is slightly larger than the dimension in the axial direction of a small-diameter hole portion 54 of a mounting hole 26 provided in the fitting member 5.

The fitting shaft portion 12 has an inner-diameter side engaging portion 16 on the outer peripheral surface. A plurality of external teeth 17 are arranged in the circumferential direction of the inner-diameter side engaging portion 16. The plurality of external teeth 17 extend in the entire axial direction of the inner-diameter side engaging portion 16, and the inner-diameter side engaging portion 16 extends in the entire axial direction of the fitting shaft portion 12.

In the present example, the plurality of external teeth 17 are arranged at equal intervals in the circumferential direction of the inner-diameter side engaging portion 16. That is, the inner-diameter side engaging portion 16 is configured by male splines. The plurality of external teeth 17 are coaxial with the shaft-side ball screw groove 13 of the thread portion 11. In the present example, each of the plurality of external teeth 17 is composed of an involute spline tooth: however, it can also be composed of an angular spline tooth.

In the present example, by spline processing the plurality of external teeth 17 based on the outer diameter of the thread portion 11, the coaxiality between the center of the pitch circle of the plurality of external teeth 17, which is a drive torque transmission portion, and the center axis of the shaft-side ball screw groove 13, which is a rotation-to-linear motion conversion portion, is improved.

Figure 4:
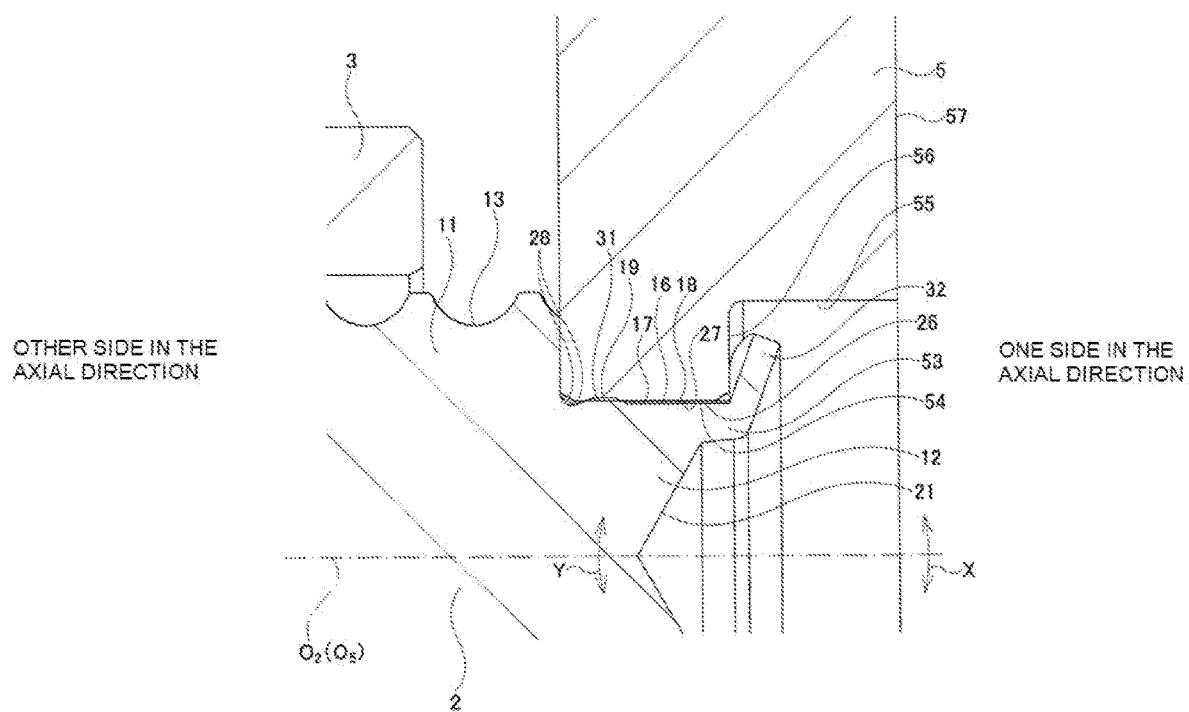
FIG. 4 is a partially enlarged view of FIG. 1.

In the present example, the tooth tip circle diameter of the plurality of external teeth 17 is constant in the axial direction: however, as illustrated in FIG. 4, the tooth root circle diameter of the plurality of external teeth 17 is are not constant in the axial direction, and the tooth root circle diameter of an end portion on the other side in the axial direction, which is one portion of the plurality of external teeth 17 in the axial direction, is slightly larger than the tooth root circle diameter of a portion toward the other end portion from an end portion of the one side in the axial direction, which is the other portion of the plurality of external teeth 17 in the axial direction.

More specifically, a raised portion 19 that is slightly raised toward the outside in the radial direction is provided at the end portion on the other side in the axial direction of a tooth root portion 18 of the plurality of external teeth 17. The raised portion 19 has a trapezoidal cross-sectional shape with respect to a virtual plane including the center axis $O_2$ of the screw shaft 2. The raised portion 19 includes inclined surfaces arranged on both sides in the axial direction and a flat surface arranged in an intermediate portion in the axial direction. The dimension in the axial direction of the raised portion 19 is preferably about 1/50 to 1/2 times the dimension in the axial direction (total length) of the plurality of external teeth 17. In this example, the dimension is approximately 1/5 times as large.

The fitting shaft portion 12 has a bottomed second center hole 21, which is a center hole, in a center portion in the radial direction of an end surface on the one side in the axial direction. The second center hole 21 has a bottom surface (back end surface) facing the one side in the axial direction. The second center hole 21 and the first center hole 15 provided in the thread portion 11 are arranged coaxially with each other. The bottom surface of the second center hole 21 is located in an intermediate portion in the axial direction of the fitting shaft portion 12 and has a conical concave surface shape. The second center hole 21 has an inner diameter larger than the first center hole 15, and is 1/2 to 4/5 times the outer diameter of a portion of the fitting shaft portion 12 separated in the axial direction from crimped portion 32.

The screw shaft 2 is arranged coaxially with the nut 3 in a state in which the thread portion 11 is inserted inside the nut 3. In a case of implementing the technique according to the present disclosure, the screw shaft may also include, in addition to the thread portion 11 and the fitting shaft portion 12, a support shaft portion (second fitting shaft portion) for externally fitting and fixing other members.

<Nut>

The nut 3 is made of metal and has a cylindrical shape as a whole. The nut 3 has a spiral nut-side ball screw groove 22 on an inner peripheral surface thereof. In the present example, the nut 3 further has a circulation groove 10.

The nut-side ball screw groove 22 has a spiral shape and is formed on the inner peripheral surface of the nut 3 by performing, for example, grinding, cutting, rolling tapping, cutting tapping, or the like. The number of nut-side ball screw grooves 22 is one, similar to the shaft-side ball screw groove 13. Similar to the shaft-side ball screw groove 13, the cross-sectional groove shape of the nut-side ball screw groove 22 is also a gothic arc shape or a circular arc shape.

The nut-side ball screw groove 22 has the same lead as the shaft-side ball screw groove 13. With the thread portion 11 of the screw shaft 2 inserted inside the nut 3, the shaft-side ball screw groove 13 and the nut-side ball screw groove 22 are arranged so as to face each other in the radial direction, configuring the load path 9.

The circulation groove 10 has a substantially S-shape and is formed on the inner peripheral surface of the nut 3 by, for example, forging (cold forging). The circulation groove 10 smoothly connects portions of the nut-side ball screw groove 22 that are adjacent in the axial direction, and connects the starting point and ending point of the load path 9. The balls 4 that have reached the ending point of the load path 9 are returned to the starting point of the load path 9 through the circulation groove 10. The starting point and ending point of the load path 9 are switched depending on the direction of relative displacement (relative rotation direction) between the screw shaft 2 and the nut 3 in the axial direction.

The circulation groove 10 has a substantially semicircular cross-sectional shape. The circulation groove 10 has a groove width slightly larger than the diameter of the balls 4, and has a groove depth that allows the balls 4 moving in the circulation groove 10 to pass over the thread of the shaft-side ball screw groove 13.

In this example, the nut 3 is used as a linear motion element, and thus the nut 3 is prevented from co-rotating with respect to the screw shaft 2 by a rotation prevention mechanism (not illustrated). In a case of implementing the technique according to the present disclosure, various conventionally known structures may be employed as the nut rotation prevention mechanism. For example, a structure may be employed in which a protruding portion (key) provided on the inner peripheral surface of a fixing member such as the housing 24 is engaged with a recessed groove formed in the axial direction in the outer peripheral surface of the nut 3.

In a case of implementing the technique according to the present disclosure, it is also possible to form a small-diameter portion at an end portion on the other side in the axial direction of the outer peripheral surface of the nut 3, an outer diameter of which is smaller than that of a portion adjacent to the one side in the axial direction. In this case, for example, a fitting cylinder such as a piston (not illustrated) can be externally fitted and fixed to the small diameter portion.

<Balls>

The plurality of balls 4 are rotatably arranged in the load path 9 and the circulation groove 10. Each of the plurality of balls 4 is made of a steel ball having a predetermined diameter. The balls 4 arranged in the load path 9 roll while receiving a compressive load. The balls 4 arranged in the circulation groove 10 are pushed by the following balls 4 and roll without being subjected to compressive loads.

<Fitting Member>

The fitting member 5 is externally fitted onto the fitting shaft portion 12 such that rotation relative to the fitting shaft portion 12 is not possible. The fitting member 5 has a circular flat plate shape, and has a mounting hole 26 penetrating in the axial direction in a center portion in the radial direction. The mounting hole 26 has an outer-diameter side engaging portion 27. A plurality of internal teeth 28 are arranged in the circumferential direction on the inner peripheral surface of the outer-diameter side engaging portion 27. The plurality of internal teeth 28 extend in the entire axial direction of the outer-diameter side engaging portion 27, and the outer-diameter side engaging portion 27 extends in the entire axial direction of the mounting hole 26 of the fitting member 5.

In this example, the plurality of internal teeth 28 are arranged at equal intervals in the circumferential direction of the outer-diameter side engaging portion 27. That is, the outer-diameter side engaging portion 27 is configured by female splines. In this example, each of the plurality of internal teeth 28 is composed of an involute spline tooth; however, it can also be composed of an angular spline tooth.

In the present example, the tooth root circle diameter and tooth tip circle diameter of the plurality of internal teeth 28 are constant in the axial direction.

In the present example, the mounting hole 26 is configured as a stepped hole, and includes a small-diameter hole portion 54 provided in a half portion on the other side in the axial direction, and a large-diameter hole portion 55 provided in a half portion on the one side in the axial direction and having an inner diameter larger than the inner diameter of the small-diameter hole portion 54.

In the present example, the outer-diameter side engaging portion 27 is provided in the entire axial direction of the inner peripheral surface of the small-diameter hole portion 54.

The large-diameter hole portion 55 has a cylindrical inner peripheral surface. The inner diameter of the large-diameter hole portion 55 is the same as the outer diameter of the thread portion 11 or is slightly smaller than the outer diameter of the thread portion 11.

The large-diameter hole portion 55 and the small-diameter hole portion 54 are connected in the radial direction by a circular ring-shaped stepped surface 56 facing the one side in the axial direction. The stepped surface 56 is configured by a flat surface perpendicular to the center axis $O_5$ of the fitting member 5, and constitutes an inner side portion in the radial direction of a side surface on the one side in the axial direction of the fitting member 5.

In the present example, the fitting member 5 has an asymmetric shape with respect to the axial direction. However, in a case of implementing the technique according to the present disclosure, the fitting member may also have a symmetrical shape with respect to the axial direction. In this case, large-diameter hole portions are provided on both sides in the axial direction of the mounting hole.

An inner-ring raceway 29 of a rolling bearing 6 is directly formed in an intermediate portion in the axial direction (in the illustrated example, the central portion) of the outer peripheral surface of the fitting member 5. That is, in the present example, the fitting member 5 also functions as an inner ring of the rolling bearing 6, and an inner ring of the rolling bearing 6 is omitted. In the present example, the rolling bearing 6 is configured by a deep-groove ball bearing capable of supporting radial loads and axial loads in both directions, and thus the inner-ring raceway 29 is of a deep groove type, and a cross-sectional shape thereof is a concave arc shape.

In the fitting member 5 of the present example, only the outer peripheral surface of the fitting member 5 on which the inner-ring raceway 29 is formed is subjected to induction hardening and tempering to form a heat-treated hardened layer. No heat-treated hardened layer is formed on the side surface on the one side in the axial direction and the side surface on the other side in the axial direction of the fitting member 5.

In the present example, a seal groove is respectively formed over the entire circumference of portions of the outer peripheral surface of the fitting member 5 separated from the inner ring raceway 29 on both sides in the axial direction, and an end portion on an inner radial side of a seal ring comes in sliding contact with the seal groove. However, the portions on both sides in the axial direction of the outer peripheral surface of the fitting member 5 may also be configured in a partial cylindrical shape.

The fitting member 5 has a plurality of support holes 30 for inserting and supporting pinion pins 41 of the planetary reduction mechanism 8 at a plurality of locations (three locations in the illustrated example) in the circumferential direction of an intermediate portion in the radial direction. The plurality of support holes 30 are arranged at equal intervals in the circumferential direction. In addition, the respective central axes of the plurality of support holes 30 are arranged parallel to each other. Each support hole 30 is configured by a through hole penetrating through the fitting member 5 in the axial direction, and is open on side surfaces on both sides in the axial direction of the fitting member 5. However, the support hole 30 may also be configured as a bottomed hole that opens on a side surface of only one side in the axial direction of the fitting member 5.

An inner diameter of each of the plurality of support holes 30 is constant in the axial direction. A diameter (inscribed circle diameter) of a virtual circle passing through an end portion on the inner side in the radial direction of the plurality of support holes 30 is slightly larger than the inner diameter of the nut 3. Moreover, a diameter (circumscribed circle diameter) of the virtual circle passing through the end portion on an outer side in the radial direction of the plurality of support holes 30 is slightly larger than the outer diameter of the nut 3.

A side surface on the one side in the axial direction of the fitting member 5 is configured by a stepped surface. Of the side surfaces on the one side in the axial direction of the fitting member 5, an outer-diameter side surface 57 located farther on an outer side in the radial direction than the stepped surface 56 is arranged so as to be parallel to the stepped surface 56 and is arranged farther on the one side in the axial direction than the stepped surface 56. However, in an intermediate portion in the radial direction of the side surface on the one side in the axial direction of the fitting member 5 that includes opening portions of the plurality of support holes 30, it is also possible to provide an overhang portion that overhangs farther toward the one side in the axial direction than portions located on the outer side in the radial direction and the inner side in the radial direction. A side surface on the other side in the axial direction of the fitting member 5 is configured by a flat surface that exists on a virtual plane orthogonal to the center axis $O_5$ of the fitting member 5.

The fitting member 5 is externally fitted to the fitting shaft portion 12 by inserting the fitting shaft portion 12 of the screw shaft 2 inside the mounting hole 26. By abutting the abutment surface 14 provided on the thread portion 11 of the screw shaft 2 against the side surface on the other side in the axial direction of the fitting member 5, the positioning of the screw shaft 2 and the fitting member 5 in the axial direction can be performed.

In the present example, when the fitting shaft portion 12 is inserted into the mounting hole 26, the outer-diameter side engaging portion 27 of the fitting member 5 engages with the inner-diameter side engaging portion 16 of the fitting shaft portion 12 such that relative rotation is not possible. More specifically, the plurality of internal teeth 28 of the outer-diameter side engaging portion 27, which are female spline teeth, engage with a spline engagement with the external teeth 17 of the inner-diameter side engaging portion 16, which are male spline teeth.

In the present example, the tooth tip circle diameter of the plurality of internal teeth 28 of the outer-diameter side engaging portion 27 is constant in the axial direction, whereas the plurality of external teeth 17 of the inner-diameter side engaging portion 16 have a raised portion 19 in the tooth root portion 18, which is a portion in the axial direction having a tooth root circle diameter which is larger than that of the other portions.

Therefore, the tooth root circle diameter at the end portion on the other side in the axial direction of the plurality of external teeth 17 of the inner-diameter side engaging portion 16 is slightly larger than the tooth tip circle diameter of the plurality of internal teeth 28 of the outer-diameter side engaging portion 27, and the tooth root circle diameter of the plurality of external teeth 17 of the inner-diameter side engaging portion 16 at a portion toward the other side in the axial direction from the end portion on the one side in the axial direction of the plurality of external teeth 17 of the inner-diameter side engaging portion is slightly smaller than the tooth tip circle diameter of the plurality of internal teeth 28 of the outer-diameter side engaging portion 27.

In a state in which the inner diameter side engaging portion 16 and the outer-diameter side engaging portion 27 are engaged, interference in the radial direction is formed between the raised portion 19 provided at the end portion on the other side in the axial direction of the tooth root portion 18 of the plurality of external teeth 17 and the tooth tip surface of the plurality of internal teeth 28.

With such a configuration, the end portion on the other side in the axial direction of the engaging portion between the inner-diameter side engaging portion 16 and the outer-diameter side engaging portion 27 becomes a press-fit portion 31 having an interference in the radial direction. That is, the press-fit portion 31, which is a portion having an interference in the radial direction, is located at a portion of the engaging portion between the inner-diameter side engaging portion 16 and the outer-diameter side engaging portion 27 that is separated toward the other side in the axial direction from the crimped portion 32 formed on the end portion on the one side in the axial direction of the fitting shaft portion 12. In the present example, the press-fit portion 31 is located at a portion of the engaging portion between the inner-diameter side engaging portion 16 and the outer-diameter side engaging portion 27 that is distant from the crimped portion 3 on the other side in the axial direction. A portion of the engagement portion between the inner-diameter side engaging portion 16 and the outer-diameter side engaging portion 27 from the end portion on the one side in the axial direction toward the other side in the axial direction is a clearance fit with a slight gap in the radial direction.

In the present example, the inner-diameter side engaging portion 16 and the outer-diameter side engaging portion 27 are provided with a press-fit portion 31, which is a portion having an interference in the radial direction, in a part in the axial direction, and thus the fitting shaft portion 12 of the screw shaft 2 is prevented from coming out in the axial direction from the fitting member 5.

In the present invention, in order to effectively prevent the fitting shaft portion 12 from coming out from the mounting hole 26 toward the other side in the axial direction, the fitting shaft portion 12 is inserted into the mounting hole 26, and in this state, the fitting shaft portion 12 has a crimped portion 32 at an end portion on the one side in the axial direction that engages with the fitting member 5 in the axial direction.

In the present example, the crimped portion 32 is provided at an end portion of the fitting shaft portion 12 on the one side in the axial direction of a cylindrical portion 53 that exists on an outer side in the radial direction of the second center hole 21, and is pressed against a side surface on the one side in the axial direction of the fitting member 5.

More specifically, the crimped portion 32 is formed over the entire circumference at the end portion on the one side in the axial direction of the fitting shaft portion 12. That is, the crimped portion 32 is configured in a circular ring shape that is continuous in the circumferential direction.

The crimped portion 32 has a substantially conical cylindrical shape that is inclined in a direction toward the one side in the axial direction as going outward in the radial direction.

The crimped portion 32 is arranged inside the large-diameter hole portion 55 provided in the fitting member 5. A side surface on the other side in the axial direction of the crimped portion 32 is pressed against the stepped surface 56. In the present example, the stepped surface 56 constitutes a side surface on the one side in the axial direction of the fitting member 5 that is pressed by the crimped portion 32.

The crimped portion 32 is arranged farther on the other side in the axial direction than the outer-diameter side surface 57 that constitutes the side surface on the one side in the axial direction of the fitting member 5. Thus, the crimped portion 32 is prevented from interfering with other members such as a sun gear 38 and planetary gears 39 of the planetary reduction mechanism 8. A gap is provided between the end portion on the outer side in the radial direction of the crimped portion 32 and the inner peripheral surface of the large-diameter hole portion 55.

In the present example, the inner-diameter side engaging portion 16 and the outer-diameter side engaging portion 27 include a portion having a radial interference in a portion in the axial direction, or in other words, by press fitting the end portion on the other side in the axial direction of the inner-diameter side engaging portion 16 into the end portion on the other side in the axial direction of the outer-diameter side engaging portion 27, and by forming the crimped portion 32 that engages in the axial direction with the stepped surface 56 of the fitting member 5 at the end portion on the one side in the axial direction of the fitting shaft portion 12, the fitting shaft portion 12 of the screw shaft 2 is prevented from coming out from the fitting member 5 in the axial direction.

<Formation of Crimped Portion>

Figures 5A, 5B:
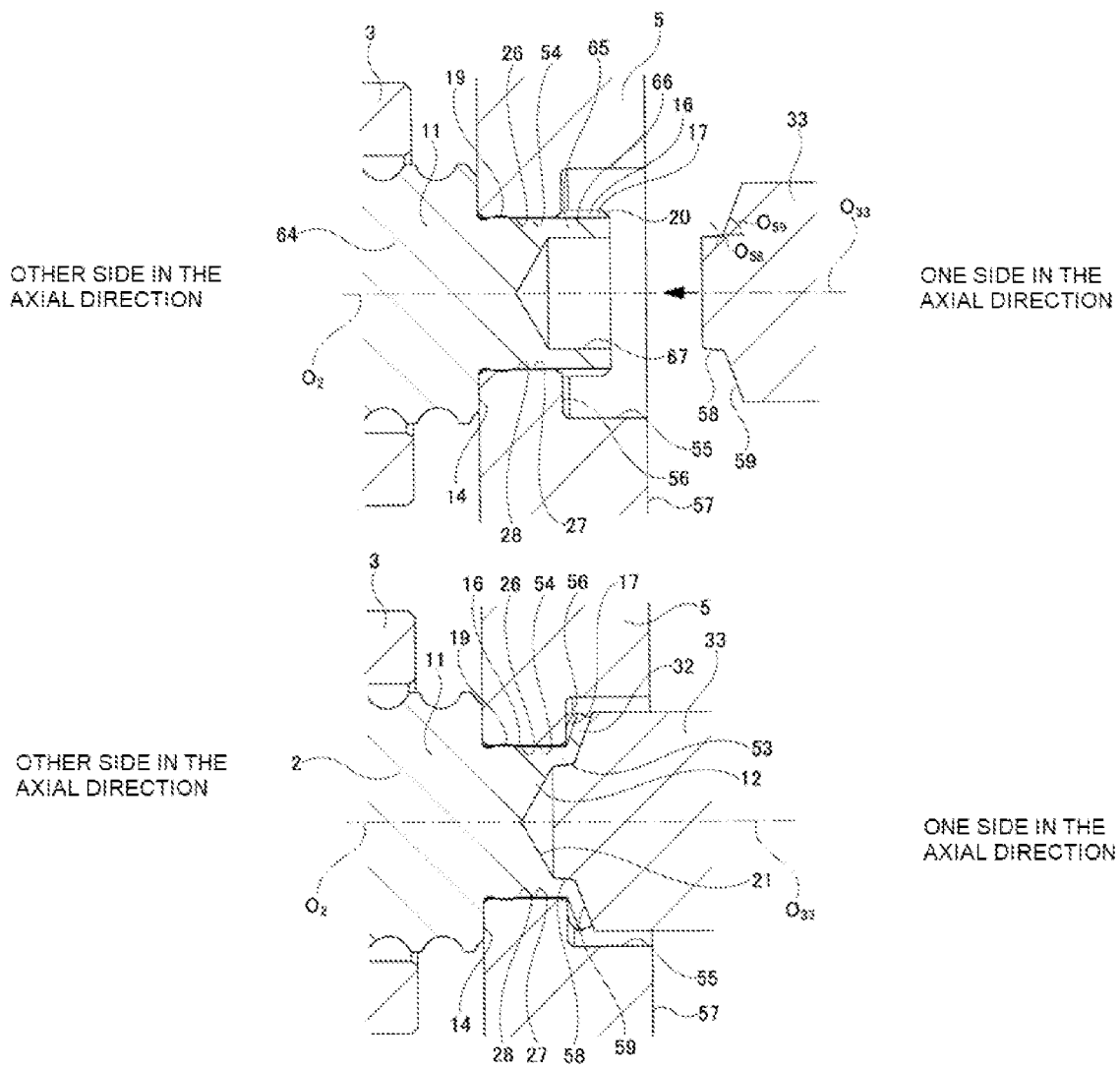
FIG. 5A and FIG. 5B are cross-sectional schematic views for describing a process of using a crimping jig to form a crimped portion at the one side in the axial direction of the fitting shaft portion of the screw shaft in the ball screw device of the first example.

The crimped portion 32 is formed by plastically working a blank screw shaft 64 as illustrated in FIG. 5A. The blank screw shaft 64 has a thread portion 11 having a spiral shaft-side ball screw groove 13 on the outer peripheral surface, and a blank fitting shaft portion 65 arranged on the one side in the axial direction of the thread portion 11; and the blank fitting shaft portion 65 has an inner-diameter side engaging portion 16 provided on the outer peripheral surface and having a plurality of external teeth 17 arranged in the circumferential direction, a blank center hole 67 opened on the end surface on the one side in the axial direction, and a blank cylindrical portion 66 existing on the outer side in the radial direction of the blank center hole 67. The blank cylindrical portion 66 has a thin cylindrical shape, and is provided in a half portion on the one side in the axial direction of the blank fitting shaft portion 65. A plurality of external teeth 17 are also provided on the outer peripheral surface of the blank cylindrical portion 66. The crimped portion 32, as illustrated in order of FIG. 5A to FIG. 5B, for example, can be formed by inserting the blank fitting shaft portion 65 of the blank screw shaft 64 into the mounting hole 26 of the fitting member 5 and externally fitting the fitting member 5 onto the blank fitting shaft portion 65, and then moving the crimping jig 33 arranged on the one side in the axial direction of the blank screw shaft 64 relative to the blank screw shaft 64 on the other side in the axial direction. In this way, the crimped portion 32 can be formed by pushing the crimping jig 33 into the blank center hole 67 of the blank screw shaft 64 from the one side in the axial direction. The blank center hole 67 has a dimension in the axial direction that is approximately ⅓ to ⅔ times a dimension in the axial direction of the blank fitting shaft portion 65.

Note that, in a state before the crimped portion 32 is formed, the blank fitting shaft portion 65 of the blank screw shaft 64 has a chamfered portions 20 on an outer peripheral edge portion of the end portion on the one side in the axial direction. The chamfered portion 20 is formed at an end portion on the outer side in the radial direction of an end portion on the one side in the axial direction of each of the plurality of external teeth 17. The chamfered portion 20 is provided in order to allow the blank fitting shaft portion 65 to be smoothly inserted into the mounting hole 26 provided in the fitting member 5.

In the present example, the crimping jig 33 is moved relative to the blank screw shaft 64 on the other side in the axial direction, and the crimped portion 32 is formed by pressing a machining surface provided on the outer peripheral surface of the crimping jig 33 against the inner peripheral surface of the blank cylindrical portion 66.

The machining surface of the crimping jig 33 has a plurality of conical machining surfaces whose generating lines have different inclination angles with respect to the center axis $O_{33}$ of the crimping jig 33. In the present example, the plurality of machining surfaces include a first machining surface 58 provided at an end portion on the other side in the axial direction of the outer peripheral surface of the crimping jig 33, and a second machining surface 59 provided in a portion of the outer peripheral surface of the crimping jig 33 located farther on the one side in the axial direction than the first machining surface 58.

The inclination angle $\theta_{59}$ of the generating line of the second machining surface 59 with respect to the center axis $O_{33}$ of the crimping jig 33 is larger than the inclination angle $\theta_{58}$ of the generating line of the first machined 58 with respect to the center axis $O_{33}$ of the crimping jig 33 ($\theta_{58} < \theta_{59}$).

In the present example, the first machining surface 58 is provided at the end portion on the other side in the axial direction of the outer peripheral surface of the crimping jig 33, and the second machining surface 59 is provided at a portion of the outer peripheral surface of the crimping jig 33 adjacent to the one side in the axial direction of the first machining surface 58. In addition, the inclination angle $\theta_{59}$ of the generating line of the second machining surface 59 with respect to the center axis $O_{33}$ of the crimping jig 33 is less than 90 degrees ($\theta_{59}$<90 degrees).

In the present example, by forming the crimped portion 32 using the crimping jig 33 having the first machining surface 58 and the second machining surface 59, the plastic working for forming the crimped portion 32 is performed in two stages. More specifically, first, the crimping jig 33 is slightly pushed into the blank center hole 67 from the one side in the axial direction, and by pressing the first machining surface 58 against the inner peripheral surface of a portion on the one side in the axial direction of the blank cylindrical portion 66, the portion on the one side in the axial direction of the blank cylindrical portion 66 is plastically deformed a little outward in the radial direction.

After that, the amount that the crimping jig 33 is pressed into the blank center hole 67 is increased, and together with pressing the first machining surface 58 against the inner peripheral surface of a portion on the other side in the axial direction of the blank cylindrical portion 66, the second machining surface 59 is pressed against a portion on the one side in the axial direction of the blank cylindrical portion 66.

As a result, a diameter of the portion on the other side in the axial direction of the cylindrical portion 66 is expanded, the outer peripheral surface of a portion on the other side in the axial direction of the blank cylindrical portion 66 is pressed against the inner peripheral surface of the small-diameter hole portion 54, and a portion of the blank cylindrical portion 66 that protrudes from the small-diameter hole portion 54 of the fitting member 5 to the one side in the axial direction is plastically deformed toward the outside in the radial direction, which forms the crimped portion 32.

In the fitting shaft portion 12 after the crimped portion 32 is formed, the outer peripheral surface of the cylindrical portion 53, and more specifically, the outer peripheral surface of the plurality of the external teeth 17 provided on the outer peripheral surface of the cylindrical portion 53 is pressed against the inner peripheral surface of the small-diameter hole portion 54. In addition, the plurality of external teeth 17 provided on the outer peripheral surface of the portion on the one side in the axial direction of the blank cylindrical portion 66 are expanded in the circumferential direction when the portion is plastically deformed outward in the radial direction, and the width in the circumferential direction expands and a part thereof bites into the stepped surface 56. In other words, the side surface on the other side in the axial direction of the crimped portion 32 is pressed against the stepped surface 56.

Figure 6:
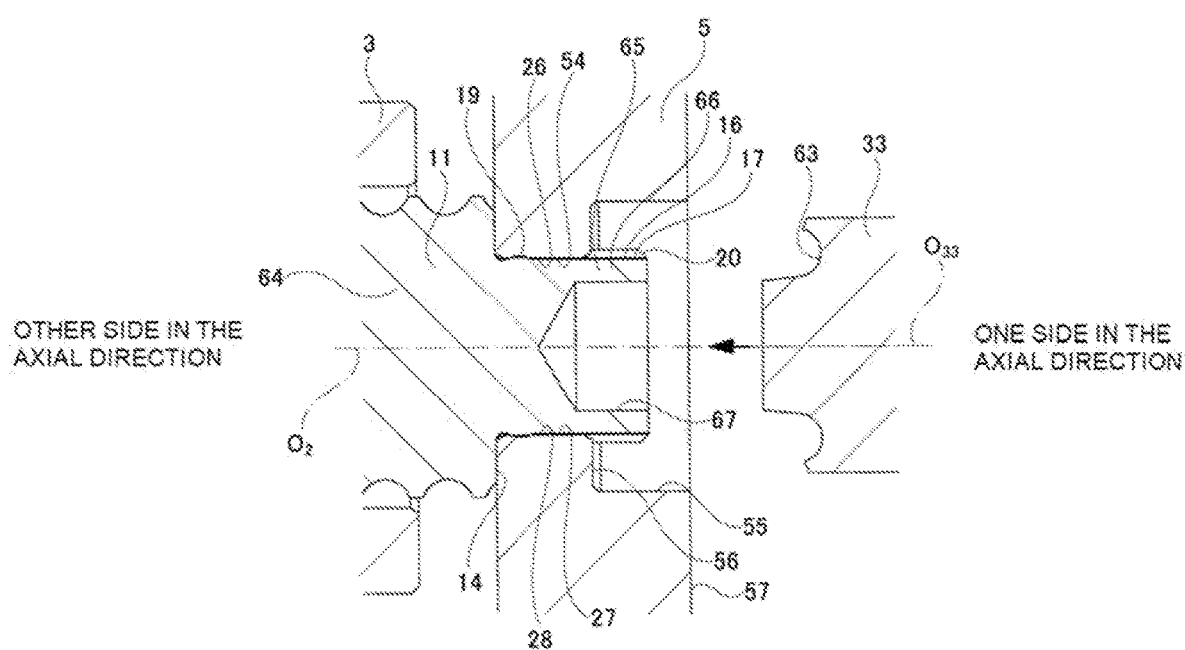
FIG. 6 is a diagram corresponding to FIG. 5A when a crimped portion is formed using another example of a crimping jig in the ball screw device of the first example.

In a case of implementing the technique according to the present disclosure, a crimping jig having only one machining surface (second machining surface) on the outer peripheral surface may also be used as the crimping jig. Alternatively, a crimping jig 33 having a curved machining surface 63 having an arc-shaped cross-sectional shape as illustrated in FIG. 6 may also be used.

In a case of implementing the technique according to the present disclosure, instead of the crimping jig 33, for example, the crimped portion 32 may also be formed using a rocking crimping device equipped with a press die having an axis of rotation inclined with respect to the center axis $O_2$ of the screw shaft 2.

<Rolling Bearing>

The rolling bearing 6 has a function of rotatably supporting the fitting member 5 that is externally fitted and fixed to the screw shaft 2 with respect to the housing 24, and supporting by the housing 24, a force in the axial direction that is transmitted to the fitting member 5.

In the present example, the rolling bearing 6 is configured by a deep-groove ball bearing: however, as the rolling bearing 6, it is also possible to use a bearing capable of supporting single-row or double-row radial loads and axial loads such as a multi-point contact ball bearing (four-point contact ball bearing), a double-row deep-groove ball bearing, a double-row angular contact ball bearing, a conical rolling bearing, and a double-row tapered roller bearing.

The rolling bearing 6 includes an outer ring 35, an inner-ring raceway 29, and a plurality of rolling elements 36.

The outer ring 35 has an annular shape and has an outer-ring raceway 37 at a center portion in the axial direction of the inner peripheral surface. The outer ring 35 is internally fitted and fixed to the housing 24 and does not rotate during use. The outer-ring raceway 37 is of a deep groove type, and a cross-sectional shape thereof is a concave arc shape. Note that by locking a retaining ring to a portion of the inner peripheral surface of the housing 24 that is separated in the axial direction from a portion into which the outer ring 35 is internally fitted, it is possible to prevent the outer ring 35 from coming off.

Of the inner peripheral surface of the outer ring 35, a locking groove is formed over the entire circumference in portions separated from the outer-ring raceway 37 on both sides in the axial direction, and an end portion on the outer diameter side of a seal ring is locked in the locking groove. However, portions on both sides in the axial direction of the inner peripheral surface of the outer ring can also be configured to have a partial cylindrical surface shape.

The inner-ring raceway 29 is directly formed at an intermediate portion in the axial direction of the outer peripheral surface of the fitting member 5, and faces the outer-ring raceway 37 in the radial direction. Accordingly, in the present example, the fitting member 5 is provided with a function as an inner ring of the rolling bearing 6, and the inner ring of the rolling bearing 6 is omitted. However, it is also possible to adopt a configuration in which the inner ring of the rolling bearing is configured separately from the fitting member, and the inner ring is externally fitted onto the fitting member.

The plurality of rolling elements 36 are made of steel or ceramic, and are arranged between the outer-ring raceway 37 and the inner-ring raceway 29 at equal intervals in the circumferential direction. In the present example, balls are used as the rolling elements 36. The rolling bearing 6 may also include a retainer for holding the rolling elements 36 at equal intervals in the circumferential direction so as to roll freely.

[Planetary Reduction Mechanism]

The planetary reduction mechanism 8 includes a sun gear 38, a plurality of planetary gears 39, a ring gear 40, the fitting member 5 functioning as a carrier, and a pinion pin 41.

The sun gear 38 is fixed to an intermediate portion of a motor shaft (sun gear shaft) 42 of the electric motor 7. The ring gear 40 is arranged coaxially with the sun gear 38 and is internally fitted and fixed in the housing 24. Note that the housing 24 can be split into two parts, and the part into which the ring gear 40 is internally fitted and the part into which the outer ring 35 of the rolling bearing 6 is internally fitted can be made of separate members.

In the present example, the end portion on the other side in the axial direction of the motor shaft 42 is inserted and arranged at an inner side in the radial direction of the crimped portion 32.

The plurality of planetary gears 39 are arranged at equal intervals in the circumferential direction and are rotatably supported by the fitting member 5. More specifically, a half portion on the other side in the axial direction of the pinion pin 41 is press-fitted into the support hole 30, and a half portion on the one side in the axial direction of the pinion pin 41 protrudes toward the one side in the axial direction from the support hole 30. The planetary gears 39 are rotatably supported around the half portion on the one side in the axial direction of the pinion pin 41 through a sliding bearing or a needle bearing (C&R), not illustrated. Each of the plurality of planetary gears 39 meshes with the sun gear 38 and the ring gear 40.

The method of fixing the pinion pin 41 to the support hole 30 is not particularly limited, and a fixing structure using crimping, a locking pin, and the like could also be adopted. In addition, another carrier may be provided to support the end portion on the one side in the axial direction of the pinion pin 41, and the pinion pin 41 may be supported on both sides.

The number of planetary gears is not particularly limited, and may be two, three, or four or more.

In the present example, the pinion pin 41 is subjected to a hardening process and a tempering process, and a heat-treated hardened layer is formed on an outer peripheral surface thereof.

<Explanation of Operation of Ball Screw Device>

When the electric motor 7 is energized and the sun gear 38 is rotated in a predetermined direction, the planetary gears 39 revolve around the sun gear 38 while rotating. The revolution motion of the planetary gears 39 is transmitted to the screw shaft 2 through the fitting member 5. The ball screw device 1 causes the nut 3 to move linearly by rotationally driving the screw shaft 2 in a predetermined direction.

For example, in a case where the sun gear 38 is rotationally driven toward one side in the circumferential direction, the nut 3 moves toward the one side in the axial direction relative to the screw shaft 2, and in a case where the sun gear 38 is rotationally driven toward the other side in the circumferential direction, the nut 3 moves toward the other side in the axial direction relative to the screw shaft 2.

Note that a stroke end related to relative movement of the nut 3 to the one side in the axial direction and to the other side in the axial direction with respect to the screw shaft 2 can be regulated using a known stroke limiting mechanism.

With the ball screw device 1 of the present example, even in a case where a moment about an axis perpendicular to the center axis acts on the screw shaft 2 or the fitting member 5, the fitting shaft portion 12 of the screw shaft 2 is effectively prevented from coming out in the axial direction.

The crimped portion 32 engages in the axial direction with the stepped surface 56 of the side surface on the one side in the axial direction of the fitting member 5, and thus in a case where a pulling force parallel to the center axis is applied to the screw shaft 2 or the fitting member 5, the fitting shaft portion 12 of the screw shaft 2 is prevented from coming out from the mounting hole 26 toward the other side in the axial direction.

In addition, when a moment about an axis perpendicular to the center axis acts on the screw shaft 2 or the fitting member 5, the center axis $O_2$ of the screw shaft 2 and the center axis $O_5$ of the fitting member 5 are inclined, and a portion of the circumferential direction of the end portion on the one side in the axial direction of the fitting shaft portion 12 tends to be pulled inside the mounting hole 26. However, in the present example, the crimped portion 32 engages in the axial direction with the stepped surface 56 of the fitting member 5, and thus the pulling of the end portion on the one side in the axial direction of the fitting shaft portion 12 into the inside of the mounting hole 26 is suppressed, which prevents the center axis $O_2$ of the screw shaft 2 and the center axis $O_5$ of the fitting member 5 from tilting.

In particular, the crimped portion 32 is formed by plastically deforming the cylindrical portion 53 outward in the radial direction, and thus a sufficient amount of engagement between the crimped portion 32 and the stepped surface 56 is ensured, and the function of the crimped portion 32 is effectively and fully demonstrated. That is, the fitting shaft portion 12 is effectively prevented from coming out from the mounting hole 26, and the center axis $O_2$ of the screw shaft 2 and the center axis $O_5$ of the fitting member 5 are also effectively prevented from being tilted.

Also, as there is a press-fit portion 31, in a case where a pull-out force parallel to the center axis acts on the screw shaft 2 or the fitting member 5, resistance to relative displacement in the axial direction between the screw shaft 2 and the fitting member 5 can be increased, and the fitting shaft portion 12 is prevented from coming out from the mounting hole 26 toward the other side in the axial direction. In addition, the press-fit portion 31 is able to suppress looseness in the radial direction of the fitting shaft portion 12 with respect to the mounting hole 26, and thus the inclination between the center axis $O_2$ of the screw shaft 2 and the center axis $O_5$ of the fitting member 5 is suppressed.

Therefore, even in a case where, due to an axial force applied to the fitting member 5, a moment acts on the fitting member 5 around an axis perpendicular to the center axis that tilts the center axis $O_5$ of the fitting member 5 with respect to the center axis $O_2$ of the screw shaft 2, as shown by arrow X in FIG. 4, the crimped portion 32 and the press-fit portion 31 prevent the center axis $O_5$ of the fitting member 5 from tilting with respect to the center axis $O_2$ of the screw shaft 2, and the fitting shaft portion 12 of the screw shaft 2 can be prevented from coming out from the fitting member 5 in the axial direction.

Even in a case where a moment acts on the screw shaft 2 around an axis perpendicular to the center axis that tilts the center axis $O_2$ of the screw shaft 2 with respect to the center axis $O_5$ of the fitting member 5, as shown by arrow Y in FIG. 4, the crimped portion 32 and the press-fit portion 31 suppress the tilting of the center axis $O_2$ of the screw shaft with respect to the center axis $O_5$ of the fitting member 5, and the fitting shaft portion 12 of the screw shaft 2 is prevented from coming out from the fitting member 5 in the axial direction.

In the present example, in the engaging portion between the inner-diameter side engaging portion 16 and the outer-diameter side engaging portion 27, the press-fit portion 31 is provided at an end portion on the other side in the axial direction, which is a position distant from the crimped portion 32 on the other side in the axial direction. That is, the crimped portion 32 and the press-fit portion 31 are arranged so as to be distant from each other in the axial direction. Therefore, in a case where a moment around an axis perpendicular to the center axis acts on the screw shaft 2 or the fitting member 5, the inclination angle between the center axis $O_2$ of the screw shaft 2 and the center axis $O_5$ of the fitting member 5 can be reduced.

In addition, in the final stage of the work of inserting the fitting shaft portion 12 into the mounting hole 26, the end portion on the other side in the axial direction of the inner-diameter side engaging portion 16 is press fitted into the end portion on the other side in the axial direction of the outer-diameter side engaging portion 27, and thus the workability of inserting the fitting shaft portion 12 into the mounting hole 26 is improved.

In the present example, the crimped portion 32 is formed over the entire circumference at the one end in the axial direction of the fitting shaft portion 12, and thus regardless of the direction in which the moment about the axis perpendicular to the center axis is applied to the screw shaft 2 or the fitting member 5, the center axis $O_2$ of the screw shaft 2 and the center axis $O_5$ of the fitting member 5 are prevented from tilting.

In the present example, when forming the crimped portion 32, the outer circumferential surface of the half portion on the other side in the axial direction of the cylindrical portion 53 is pressed against the inner peripheral surface of the small-diameter hole portion 54, and due to this, when a pull-out force parallel to the center axis is applied to the screw shaft 2 or the fitting member 5, the resistance against relative displacement in the axial direction between the screw shaft 2 and the fitting member 5 can be increased, and the fitting shaft portion 12 is prevented from coming out from the mounting hole 26 toward the other side in the axial direction. In addition, the pressing portion of the outer peripheral surface of the half portion on the other side in the axial direction of the cylindrical portion 53 that presses against the inner peripheral surface of the small-diameter hole portion 54 can suppress looseness in the radial direction of the fitting shaft portion 12 relative to the mounting hole 26, and thus, tilting of the center axis $O_2$ of the screw shaft 2 and the center axis $O_5$ of the fitting member 5 can be effectively suppressed.

In the present example, the width in the circumferential direction of the external teeth 17 provided on the outer peripheral surface of the crimped portion 32 is expanded, and thus even in a case where the outer peripheral surface of the crimped portion 32 separates from the stepped surface 56 of the fitting member 5 due to use over a long period of time, it becomes difficult for the external teeth 17 to move in the axial direction between the internal teeth 28 that are adjacent to each other in the circumferential direction, which makes it possible to prevent the fitting shaft portion 12 from coming out from the fitting member 5 toward the other side in the axial direction.

In the present example, the inclination angle $\theta_{59}$ of the second machining surface 59 provided on the outer peripheral surface of the crimping jig 33 is less than 90°, and thus the crimping load required to plastically deform the cylindrical portion 53 by moving the crimping jig 33 relative to the screw shaft 2 toward the other side in the axial direction can be prevented from becoming excessively large.

In the present example, the inner-ring raceway 29 of the rolling bearing 6 is directly formed on the outer peripheral surface of the fitting member 5, and the inner ring of the rolling bearing 6 is omitted, and thus it is possible to reduce the number of items, reduce assembly man-hours, and improve assembly efficiency. In addition, in a case of externally fitting and fixing a separate inner ring to the fitting member 5, a flange portion is required to transmit the force in the axial direction to the outer peripheral surface of the fitting member 5; however, in the present example, such a flange portion is not necessary, and the number of processing steps can be reduced.

In the present example, a flange portion is not necessary, and thus it is sufficient to form a heat-treated hardened layer only on the outer peripheral surface of the fitting member 5 that includes the inner-ring raceway 29. Thus, when drilling holes in the side surface in the axial direction of the fitting member 5 to form the support holes 30, there is no need to remove the heat-treated hardened layer, and the number of processing steps can be reduced.

In the present example, the axial force transmitted to the fitting member 5 can be supported by the housing 24 through the rolling bearing 6. More specifically, a reaction force in the axial direction that acts on the screw shaft 2 from the nut 3 through the balls 4 when the screw shaft 2 is rotationally driven is prevented from being transmitted to the engaging portion between the planetary gears 39, the sun gear 38, and the ring gear 40.

Moreover, in a case of using a helical gear as the planetary gear 39 for reasons such as ensuring sound vibration performance, a force in the axial direction acts on the fitting member 5: however, such axial force is prevented from being transmitted to the rolling contact portions between the balls 4 and the shaft-side ball screw groove 13 and the nut-side ball screw groove 22.

Second Example

A second example of an embodiment according to the present disclosure will be described using FIG. 7A and FIG. 7B.

In the present example, of the structure of the first example, only the shape of the outer peripheral surface of the crimping jig 33a is changed. In the present example, the machining surface provided on the outer peripheral surface of the crimping jig 33a includes a first machining surface 58, a second machining surface 59, and a relief groove portion 60. The first machining surface 58 and the second machining surface 59 are connected through the relief groove portion 60. In other words, the crimping jig 33a has the relief groove 60 in a portion between the first machining surface 58 and the second machining surface 59 of the machining surfaces provided on the outer peripheral surface.

The relief groove portion 60 has a concave arc-shaped cross-sectional shape. The radius of curvature of the relief groove portion 60 is sufficiently smaller than the outer diameter of the end surface (tip-end surface) on the other side in the axial direction of the crimping jig 33a.

In the present example, when forming the crimped portion 32 by moving the crimping jig 33 relative to the blank screw shaft 64 toward the other side in the axial direction and pressing the machining surface provided on the outer peripheral surface of the crimping jig 33 against the inner peripheral surface of the blank cylindrical portion 66, the relief groove portion 60 can be made to face the inner peripheral surface of a bent portion 61 that connects the half portion on the one side in the axial direction of the blank cylindrical portion 66 and the half portion on the other side in the axial direction of the blank cylindrical portion 66, and since this may be performed without causing the outer peripheral surface of the crimping jig 33a to come into contact with the bent portion 61, it is not necessary to apply external force to the bent portion 61.

With the present example, the thickness of the bent portion 61 can be prevented from becoming excessively small, and the thickness of the bent portion 61 can be ensured, and thus it is easier to ensure the strength of the crimped portion 32.

The other configurations and effects of the second example are the same as those of the first example.

Figure 8A:
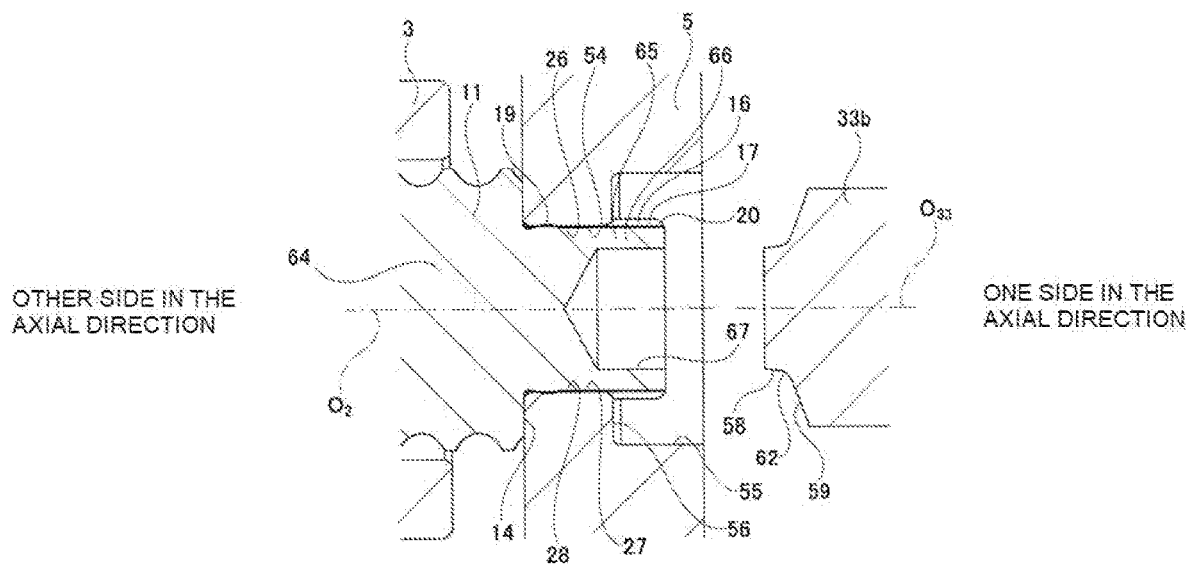
FIG. 8A and FIG. 8B are diagrams corresponding to FIG. 5A and FIG. 5B regarding a modification of the second example.
Figure 8B:
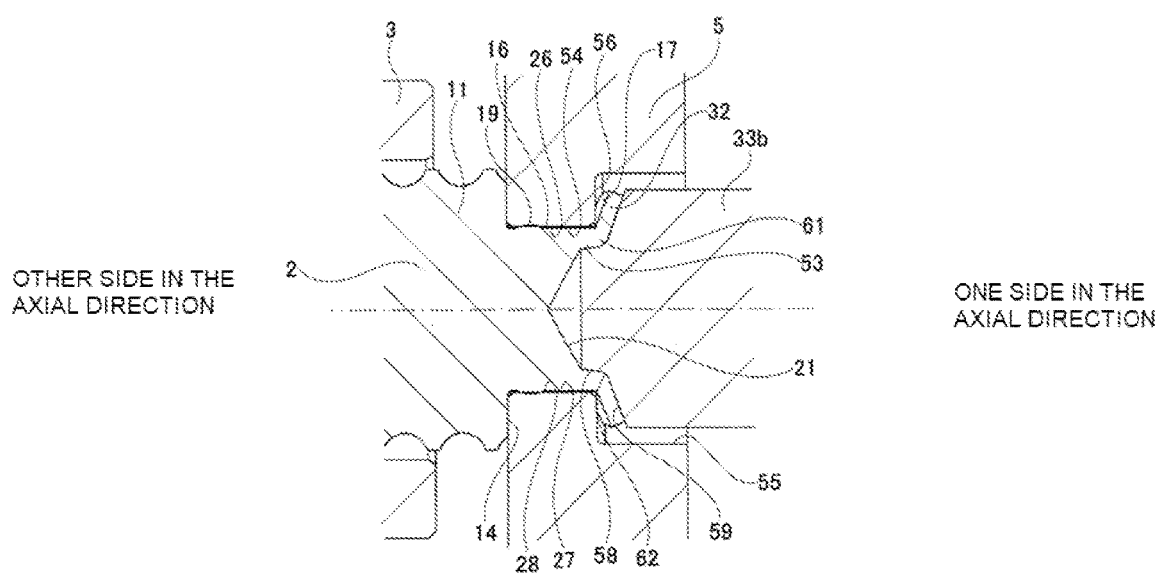

In a modification of the second example, as illustrated in FIG. 8A and FIG. 8B, the machining surface provided on the outer peripheral surface of the crimping jig 33b includes a first machining surface 58, a second machining surface 59, and a corner R portion 62. The corner R portion 62 smoothly connects the first machining surface 58 and the second machining surface 59. The radius of curvature of the corner R portion 62 is sufficiently larger than the radius of curvature of the relief groove portion 60.

When forming the crimped portion 32 using the crimping jig 33b of the present example, the corner R portion 62 of the machining surface provided on the outer peripheral surface of the crimping jig 33b is pressed against the inner peripheral surface of the bent portion 61. Therefore, the thickness of the bent portion 61 can be made uniform, and compressive stress can be applied to the bent portion 61, and thus the occurrence of cracks in the bent portion 61 is suppressed.

Third Example

Figure 9A:
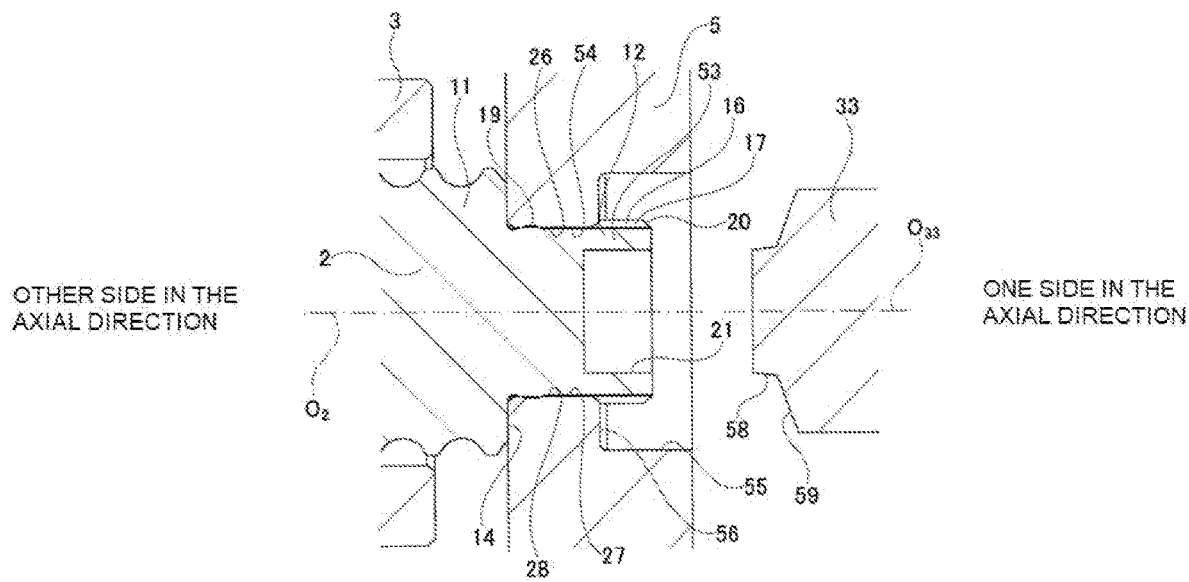
FIG. 9A and FIG. 9B are diagrams corresponding to FIG. 5A and FIG. 5B regarding a third example of an embodiment according to the present disclosure.
Figure 9B:
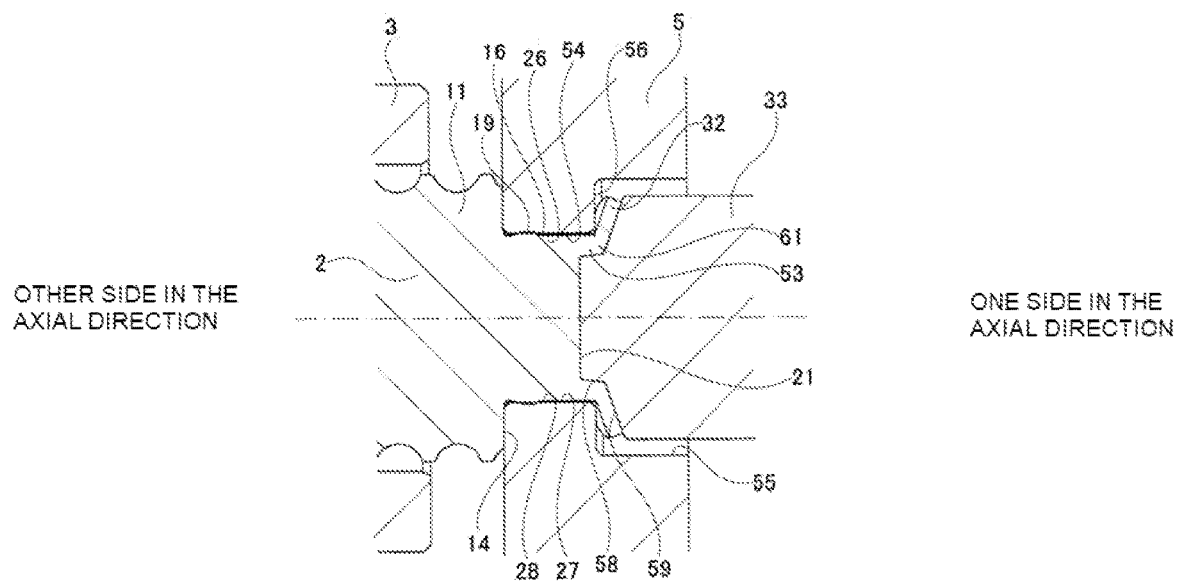
Figure 10:
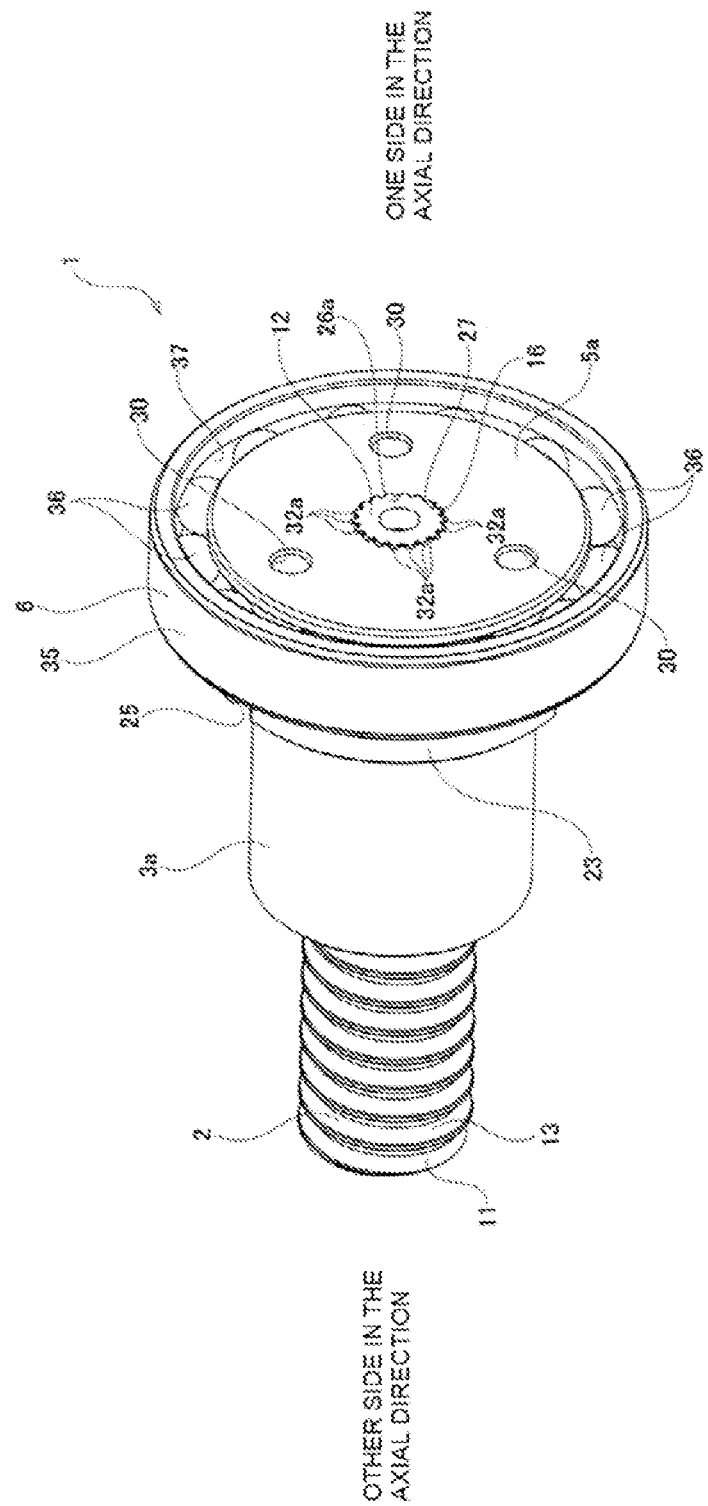
FIG. 10 is a perspective view of a ball screw device of a fourth example of an embodiment according to the present disclosure.
Figure 11:
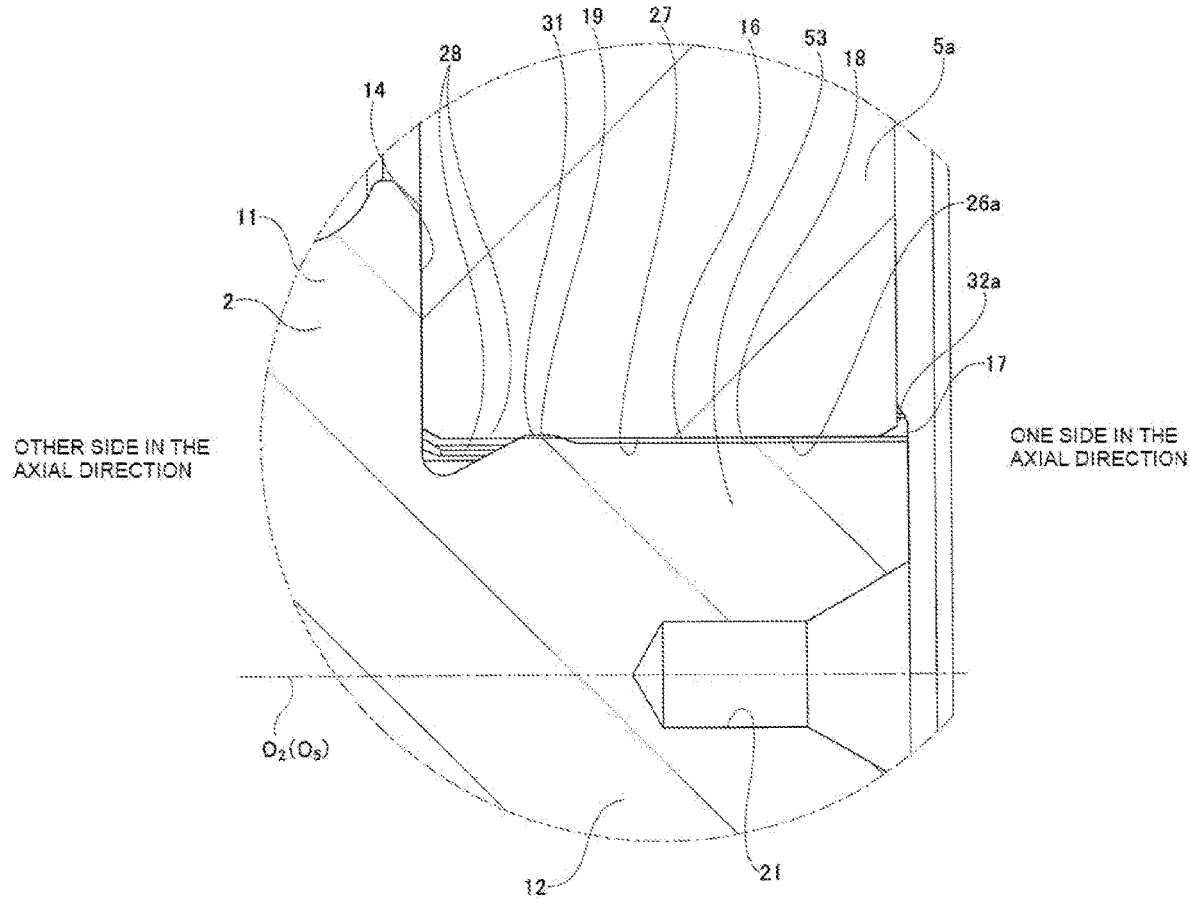
FIG. 11 is a diagram corresponding to FIG. 4 regarding the fourth example.

A third example of an embodiment according to the present disclosure will be described using FIG. 9A and FIG. 9B.

In the present example, the method of forming the crimped portion 32 is changed from the method of the first example. In the present example, the amount of movement of the crimping jig 33 toward the other side in the axial direction, that is, the amount of pushing of the crimping jig 33 into the blank center hole 67 is regulated using the end surface on the other side in the axial direction of the crimping jig 33 and the bottom surface of the blank center hole 67 (second center hole 21).

More specifically, when the crimping jig 33 is relatively moved to the other side in the axial direction with respect to the screw shaft 64, the crimping jig 33 is moved toward the other side in the axial direction with respect to the screw shaft 2 until an end surface (tip-end surface) on the other side in the axial direction of the crimping jig 33 comes in contact with the bottom surface of the blank center hole 67. The position where the end surface on the other side in the axial direction of the crimping jig 33 comes in contact with the bottom surface of the blank center hole 67 is the stopping position of the crimping jig 33. In the present example, the dimensions of each part are regulated so that the crimped portion 32 is properly formed at the position where the end surface on the other side in the axial direction of the crimping jig 33 comes in contact with the bottom surface of the blank center hole 67.

In the present example, in order to strictly regulate the stopping position of the crimping jig 33, the bottom surface of the blank center hole 67 (second center hole 21) is configured by a flat surface existing on a virtual plane orthogonal to the center axis $O_2$ of the screw shaft 2, and the end surface on the other side in the axial direction of the crimping jig 33 is configured by a flat surface that exists on a virtual plane orthogonal to a center axis $O_{33}$ of the crimping jig 33, and thus the flat surfaces come in contact with each other.

With the present example, the crimping jig 33 is prevented from relatively moving more than necessary with respect to the screw shaft 64 toward the other side in the axial direction, and thus it is easy to regulate the thickness of the crimped portion 32 to an appropriate thickness. Particularly, the thickness of the bent portion 61 of the crimped portion 32 is prevented from becoming excessively small. On the other hand, due to insufficient force to move the crimping jig 33 toward the other side in the axial direction, a gap is also prevented from being formed between the outer peripheral surface of the crimped portion 32 and the stepped surface 56 of the fitting member 5.

The other configurations and effects of the third example are the same as those of the first example.

Fourth Example

A fourth example of the embodiment of the present disclosure will be described using FIG. 10 to FIG. 14D.

In the present example, the structure of the crimped portion 32a is different from the structures of the first to third examples. In the present example, the crimped portion 32 is formed by plastically deforming only an end portion on the one side in the axial direction of at least one of the plurality of external teeth 17, that is different from a structure where a crimped portion is formed at an end portion on the one side in the axial direction of the cylindrical portion 53 by plastically deforming a portion on the one side in the axial direction of the blank cylindrical portion 66.

More specifically, in a state in which the fitting shaft portion 12 is inserted into the mounting hole 26, at least one external tooth 17 of the plurality of external teeth 17 protruding in the axial direction from the mounting hole 26 has a crimped portion 32a formed at the end portion on the one side in the axial direction, and engages in the axial direction with the inner peripheral edge portion on the one side in the axial direction of the fitting member 5.

Figure 12:
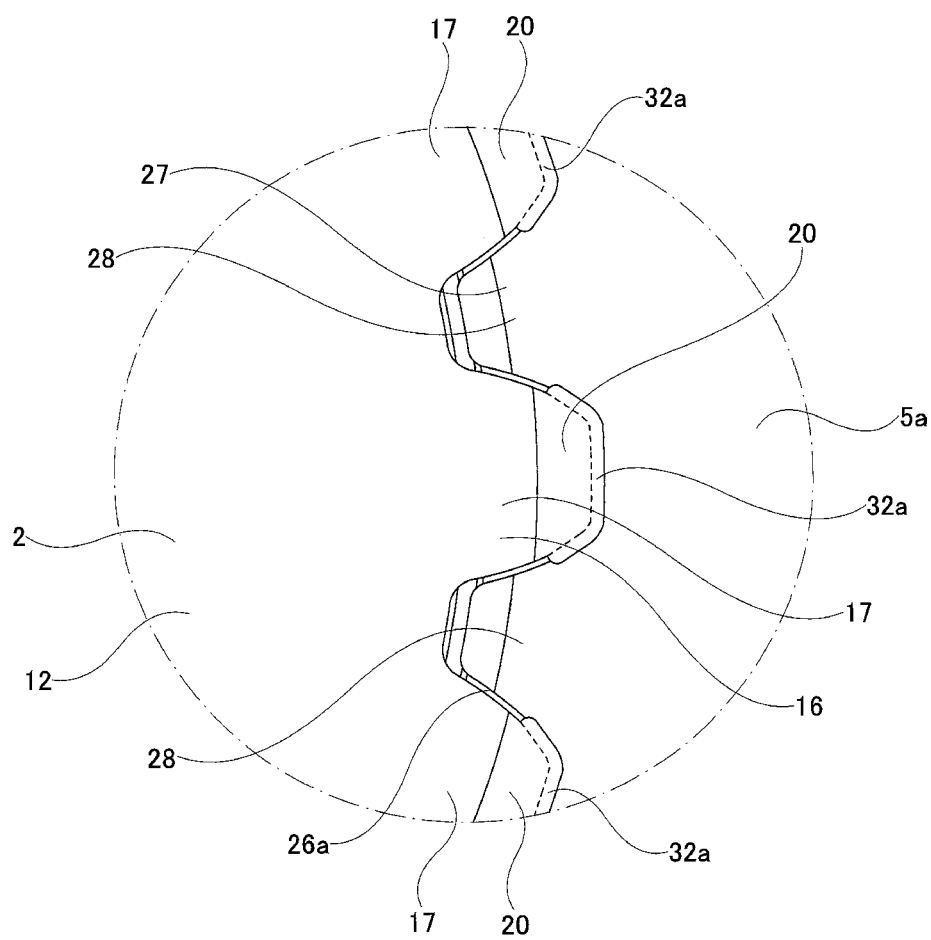
FIG. 12 is a partially enlarged end view of a fitting portion between the fitting shaft portion of the screw shaft and a mounting hole of a carrier, as viewed from one side in the axial direction, in the fourth example.
Figure 13:
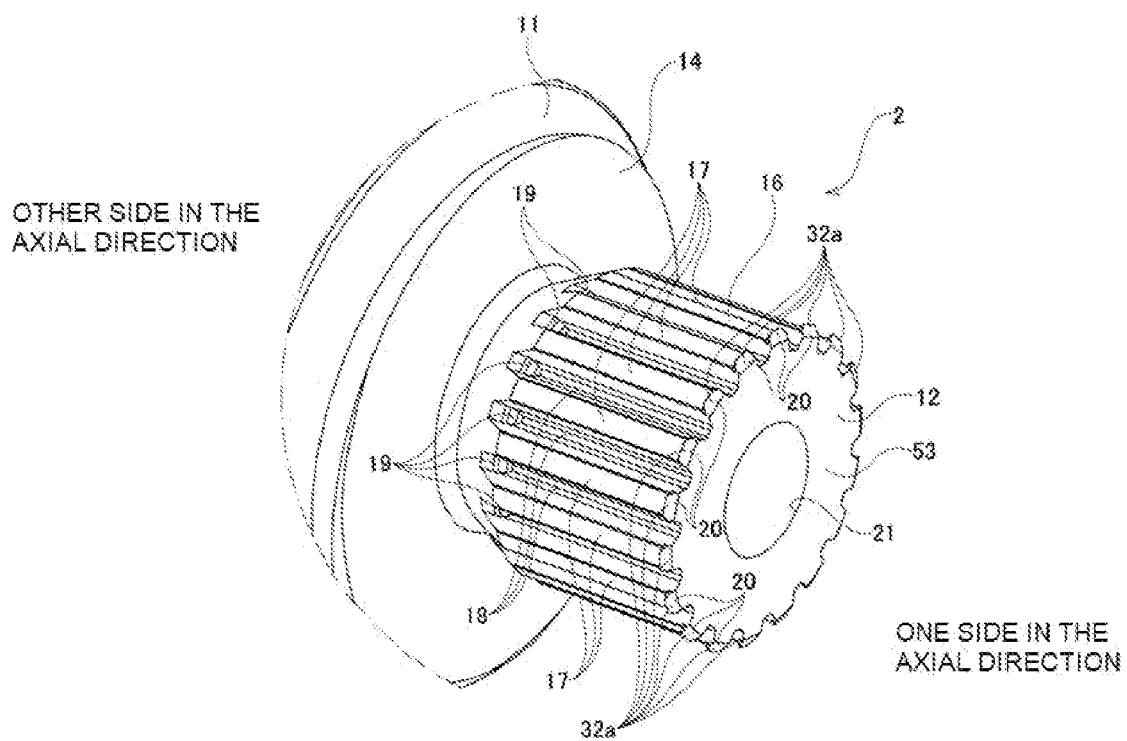
FIG. 13 is a partially enlarged perspective view showing the screw shaft removed from the ball screw device of the fourth example.

As illustrated in FIG. 12, the crimped portion 32a protrudes outward in the radial direction and toward both sides in the circumferential direction from the at least one external tooth 17, and has a substantially U-shape when viewed in the axial direction.

The crimped portion 32a is pressed against the inner peripheral edge portion on the one side in the axial direction of the fitting member 5 without any gaps in both the axial direction and the radial direction. That is, the crimped portion 32a, is pressed against both the end portion on the inner side in the radial direction of a portion of the side surface on the one side in the axial direction of the fitting member 5a whose phase in the circumferential direction matches that of the tooth root portion of the internal teeth 28, and the end surface on the one side in the axial direction of the internal teeth 28, and is pressed in the radial direction against the tooth root portion of the internal teeth 28.

In the present example, the crimped portion 32a is formed on all of the plurality of external teeth 17. That is, the crimped portion 32a is composed of a plurality of crimped portions 32a. The plurality of crimped portions 32a are arranged at equal intervals in the circumferential direction.

In the present example, the fitting shaft portion 12 of the screw shaft 2 has a chamfered portion 20 on the outer peripheral edge portion of the end portion on the one side in the axial direction. The chamfered portion 20 is formed at an end portion on the outer side in the radial direction of an end portion on the one side in the axial direction of each of the plurality of external teeth 17.

Particularly, in the present example, in order to maintain the volume (thickness) of the crimped portion 32a, the size of the chamfer of the chamfered portion 20 formed on the outer peripheral edge portion of the end portion on the one side in the axial direction of the fitting shaft portion 12 (cylindrical portion 53) is kept smaller than that of a typical chamfer. More specifically, the chamfered portion 20 is configured by C chamfering or thread chamfering, and the size of the horizontal and vertical chamfers is about 0.05 mm to 0.2 mm.

In the present example, the nut 3a has an outward facing flange-shaped flange portion 23 at an end portion on the one side in the axial direction of the outer peripheral surface. The flange portion 23 is provided with engaging grooves 25 (see FIG. 10) at a plurality of locations in the circumferential direction that engage with a rotation prevention member (not illustrated) provided on a fixed member such as the housing 24 to prevent the nut 3a from co-rotation In the present example, the fitting member 5a has an outer-diameter side engaging portion 27 over the entire inner peripheral surface in the axial direction of a mounting hole 26a. The mounting hole 26a does not have the large-diameter hole portion that the mounting hole 26 of the first example has, and is not a stepped hole. In addition, the fitting member 5a has a symmetrical shape with respect to the axial direction.

The crimped portion 32a is formed by plastically working a blank screw shaft 64a as illustrated in FIG. 14A. The blank screw shaft 64a has a thread portion 11 having a spiral shaft-side ball screw groove 13 on the outer peripheral surface, and a blank fitting shaft portion 65a arranged on the one side in the axial direction of the thread portion 11; and the blank fitting shaft portion 65a includes a blank inner-diameter side engaging portion 69 provided on the outer peripheral surface and having a plurality of blank external teeth 68 arranged in the circumferential direction.

The crimped portion 32a, as illustrated in order in FIG. 14A to FIG. 14D, for example, can be formed by inserting the blank fitting shaft portion 65a of the blank screw shaft 64a into the mounting hole 26a of the fitting member 5a and externally fitting the fitting member Sa onto the blank fitting shaft portion 65a, and then relatively moving the crimping jig 33c arranged on the one side in the axial direction of the blank screw shaft 64a to the other side in the axial direction with respect to the blank screw shaft 64a.

The crimped portion 32a is formed by plastically deforming an end portion on the one side in the axial direction of at least one blank external tooth 68 toward the outside in the radial direction and both sides in the circumferential direction.

In the present example, the crimped portion 32a is formed by relatively moving the crimping jig 33c to the other side in the axial direction with respect to the screw shaft 64a, and pressing the machining surface 34 provided on the side surface on the other side in the axial direction of the crimping jig 33c against the end portion on the one side in the axial direction of at least one blank external tooth 68 of the plurality of blank external teeth 68 of the blank inner-diameter side engaging portion 69.

The machining surface 34 of the crimping jig 33c is configured by an inclined surface that is inclined in a direction toward the outer side in the radial direction as going toward the other side in the axial direction. In the present example, the crimped portion 32a is deformed on all of the external teeth 17, and thus the machining surface 34 is configured by a truncated conical surface, the inner diameter of which increases going toward the other side in the axial direction.

In the present example, a plurality of crimped portions 32a are formed simultaneously by using the crimping jig 33c having the machining surface 34. More specifically, a plurality of crimped portions 32a are formed by pressing the machining surface 34 of the crimping jig 33c against end portions on the one side in the axial direction of the plurality of blank external teeth 68 that protrude from the side surface on the one side in the axial direction of the fitting member 5a, and plastically deforming the end portions on the one side in the axial direction of the plurality of blank external teeth 68 respectively toward the outer side in the radial direction and both sides in the circumferential direction.

With the present example, even in a case where a moment around an axis perpendicular to the center axis is applied to the screw shaft 2 or the fitting member 5a, the fitting shaft portion 12 of the screw shaft 2 is effectively prevented from coming out from the fitting member 5a in the axial direction.

The crimped portion 32a engages in the axial direction with the inner peripheral edge portion on the one side in the axial direction of the fitting member 5a, and thus, in a case where a pull-out force parallel to the center axis is applied to the screw shaft 2 or the fitting member 5a, the fitting shaft portion 12 of the screw shaft 2 is prevented from coming out from the mounting hole 26a toward the other side in the axial direction.

Moreover, the crimped portion 32a engages in the axial direction with the inner peripheral edge portion on the one side in the axial direction of the fitting member 5a, and thus, even in a case where a moment around an axis perpendicular to the center axis acts of the screw shaft 2 or the fitting member 5a, the end portion on the one side in the axial direction of the fitting shaft portion 12 is prevented from being drawn into the mounting hole 26a, and the center axis $O_2$ of the screw shaft 2 and the center axis $O_5$ of the fitting member 5a are prevented from being tilted.

In the present example, the crimped portion 32a is configured by a plurality of crimped portions 32a, and thus stress acting on each crimped portion 32a may be reduced. In addition, regardless of the direction in which the moment acts on the screw shaft 2 or the fitting member 5a about an axis perpendicular to the center axis, the center axis $O_2$ of the screw shaft 2 and the center axis $O_5$ of the fitting member 5a are prevented from tilting.

The plurality of crimped portions 32a are arranged at equal intervals in the circumferential direction, and thus large stress acting on part of the crimped portions 32a is suppressed, and loss of rotational balance between the screw shaft 2 and the fitting member 5a is also suppressed.

In the present example, the size of the chamfer of the chamfered portion 20 formed on the outer peripheral edge portion of the fitting shaft portion 12 is smaller than the size of a typical chamfer, and thus it is possible to maintain both the workability of the work of inserting the fitting shaft portion 12 and the volume of the crimped portions 32a.

In the present example, the crimped portion 32a is formed so as to protrude outward in the radial direction and on both sides in the circumferential direction from at least one external tooth 17 of the plurality of external teeth 17, and thus the crimped portion 32a and the inner peripheral edge portion on the one side in the axial direction of the fitting member Sa are sufficiently engaged. That is, the crimped portion 32a effectively prevents the fitting shaft portion 12 from coming out from the mounting hole 26a, and tilting of the center axis $O_2$ of the screw shaft 2 and the center axis $O_5$ of the fitting member 5a is effectively suppressed.

In the present invention, the crimped portion 32a is formed on only the end portion on the one side in the axial direction of the external teeth 17, and since the crimping load required to form the crimped portion 32a is sufficiently small, the manufacturing cost of the ball screw device 1 can be reduced. In addition, the fitting member 5a has a symmetrical shape in the axial direction, and since there is no axial directionality of the fitting member 5a, restrictions on the assembly direction are relaxed, and the ease of assembly of the ball screw device 1 is improved.

Fifth Example

Figure 15:
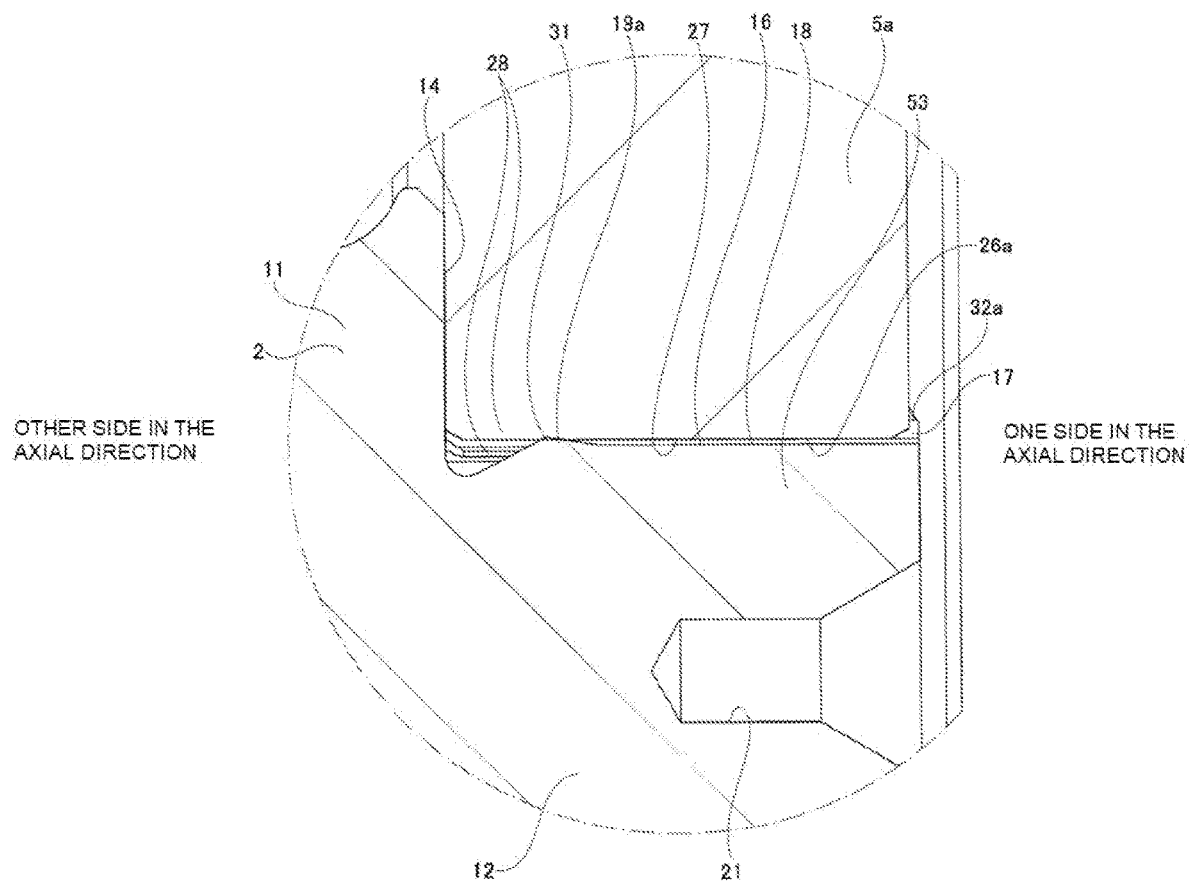
FIG. 15 is a diagram corresponding to FIG. 4 regarding a fifth example of the embodiment according to the present disclosure.

A fifth example of an embodiment according to the present disclosure will be described using FIG. 15.

In the present example, only the shape of the raised portion 19a formed on the tooth bottom portion 18 of the plurality of external teeth 17 is changed from the structure of the fourth example. In the present example, the raised portion 19a has a triangular cross-sectional shape. The raised portion 19a is composed of inclined surfaces arranged on both sides in the axial direction and a corner portion arranged in an intermediate portion in the axial direction.

By making the cross-sectional shape of the raised portion 19a a triangular shape, the tooth bottom portion 18 of the external teeth 17 can be processed more easily than in a case where the raised portion 19 (see FIG. 4 and FIG. 11) has a trapezoidal cross-sectional shape as in the first to fourth examples. In addition, in a case where a height dimension in the radial direction of the raised portion 19a is the same as a height dimension in the radial direction of the raised portion 19 of the structures of the first to fourth examples, the dimension in the axial direction of the inclined surface on the one side in the axial direction can be increased, and thus the press-fitting load when inserting the fitting shaft portion 12 into the mounting hole 26a can be reduced.

The other configurations and effects of the fifth example are the same as those of the first and fourth examples.

Sixth Example

Figure 16:
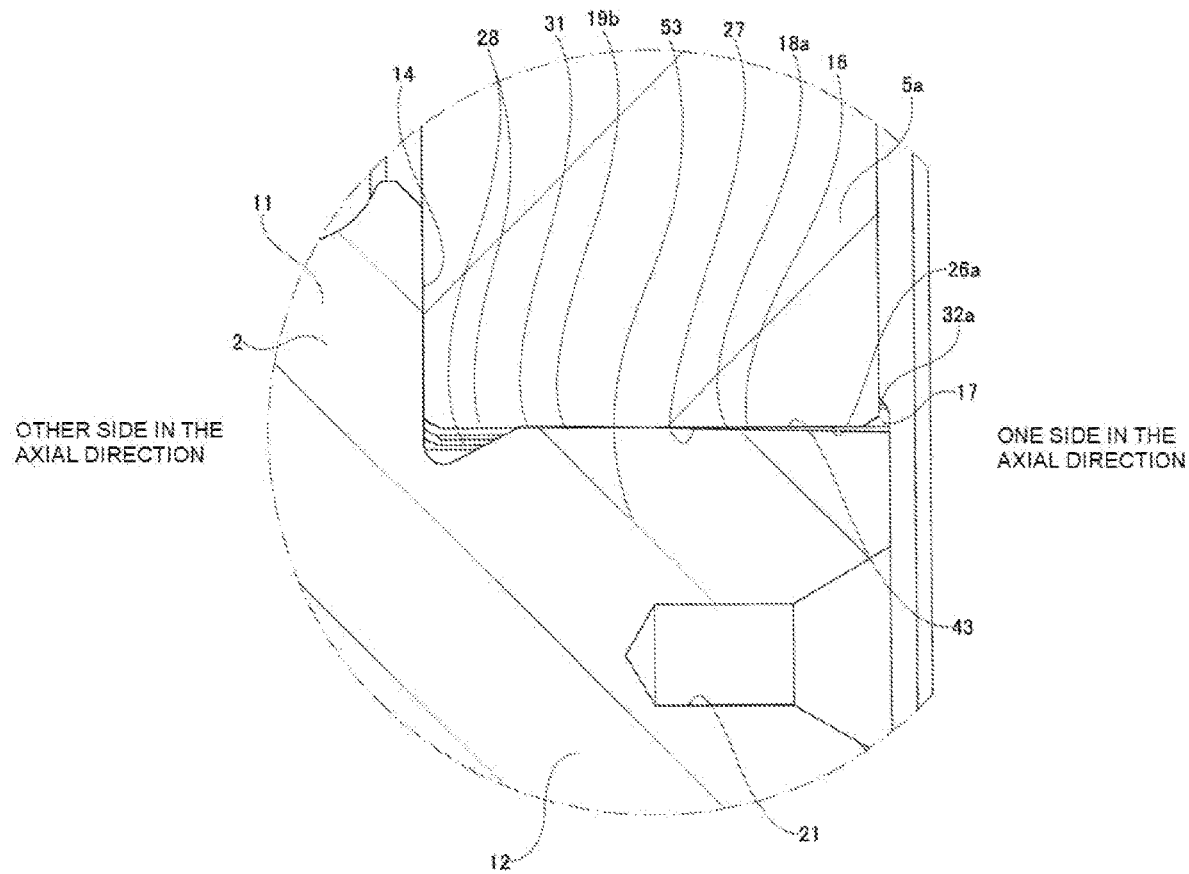
FIG. 16 is a diagram corresponding to FIG. 4 regarding a sixth example of the embodiment according to the present disclosure.

A sixth example of an embodiment according to the present disclosure will be described using FIG. 16.

In the present example, only the shape of the tooth root portion 18a of the external teeth 17 is changed. In the present example, the entire axial direction of the tooth root portion 18a is configured by an inclined surface.

The tooth root circle diameter of the plurality of external teeth 17 increases from the one side in the axial direction to the other side in the axial direction. The tooth root circle diameter of the plurality of external teeth 17 at an end portion on the other side in the axial direction of the plurality of external teeth 17 is larger than the tooth root circle diameter at a portion from the end portion on the one side in the axial direction toward the other side in the axial direction. The tooth root circle diameter at the end portion on the other side in the axial direction of the plurality of external teeth 17 is slightly larger than the tooth tip circle diameter of the plurality of internal teeth 28, and the tooth root circle diameter of the plurality of external teeth 17 at the portion from the end portion on the one side in the axial direction toward the other side in the axial direction is smaller than the tooth tip circle diameter of the internal teeth 28.

That is, a raised portion 19b having a triangular cross-sectional shape is formed at the tooth root portion 18a of the plurality of external teeth 17 at the end portion on the other side in the axial direction, and a recessed portion 43 having a triangular cross-sectional shape and recessed radially inward is formed at the portion from the end portion on the one side in the axial direction toward the other side in the axial direction so as to smoothly connect with the raised portion 19b.

In the present example, the tooth root portion 18a of the plurality of external teeth 17 can be easily processed, and thus the cost of processing the screw shaft 2 can be reduced.

The other configurations and effects of the sixth example are the same as those of the first and fourth examples.

Seventh Example

Figure 17:
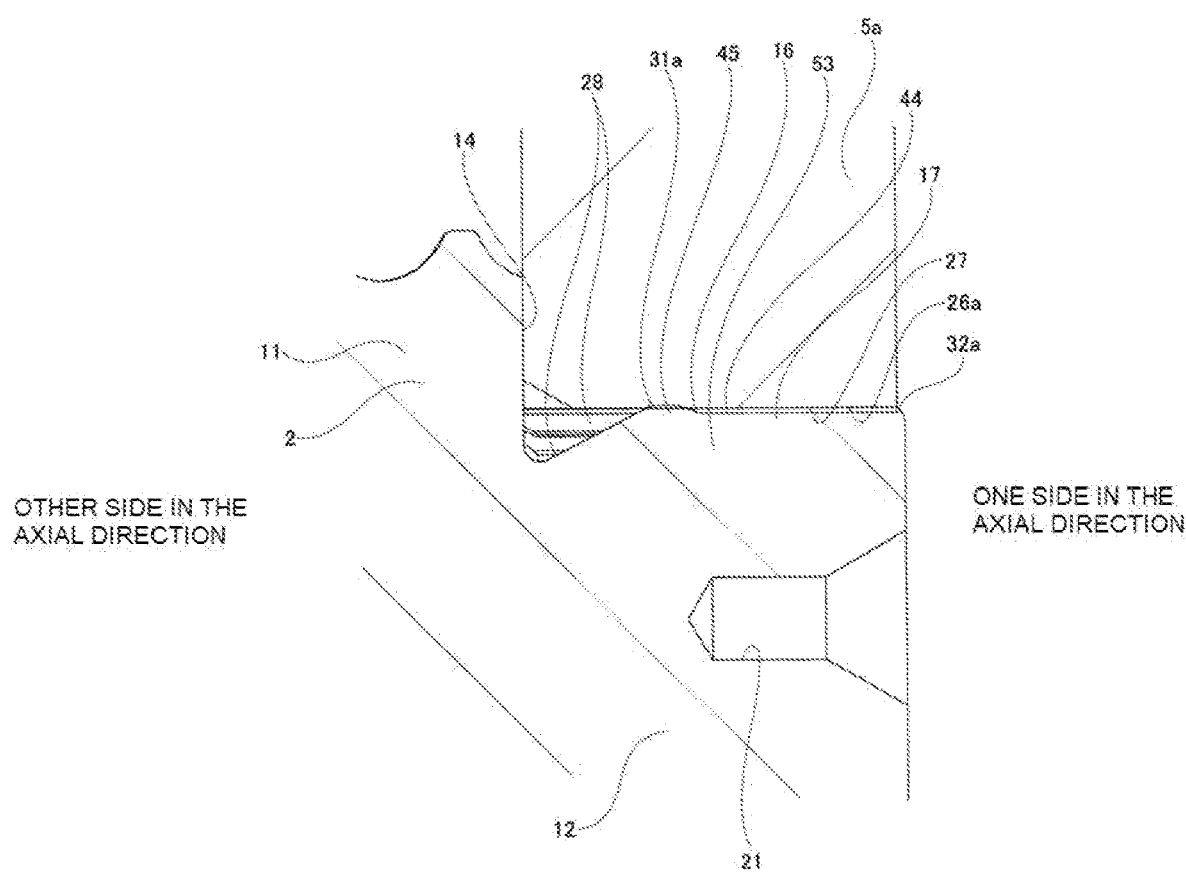
FIG. 17 is a diagram corresponding to FIG. 4 regarding a seventh example of the embodiment according to the present disclosure.

A seventh example of an embodiment according to the present disclosure will be described using FIG. 17.

In the present example, the tooth root circle diameter of the plurality of external teeth 17 is constant over the axial direction. Instead, the tooth tip circle diameter of the plurality of external teeth 17 is not constant in the axial direction, and the tooth tip circle diameter at the end portion on the other side in the axial direction, which is one portion in the axial direction, is slightly larger than the tooth tip circle diameter in the portion from the end portion on the one side in the axial direction to the other side in the axial direction, which is the other portion.

More specifically, the tooth tip circle diameter at the end portion on the other side in the axial direction of the plurality of external teeth 17 is slightly larger than the tooth root circle diameter of the plurality of internal teeth 28, and the tooth tip circle diameter of the plurality of external teeth 17 at a portion from the end portion on the one side in the axial direction toward the other side in the axial direction is slightly smaller than the tooth root circle diameter of the plurality of internal teeth 28. That is, a raised portion 45 that is slightly raised toward the outer side in the radial direction is provided at the end portion on the other side in the axial direction of a tooth tip portion 44 of the plurality of external teeth 17.

In the present example, in a state in which the inner-diameter side engaging portion 16 and the outer-diameter side engaging portion 27 are engaged, an interference in the radial direction is formed between the tooth root surface of the plurality of internal teeth 28 and the raised portion 45 provided on the tooth tip portion 44 of the external teeth 17. Therefore, the end portion on the other side in the axial direction of the engaging portion between the inner-diameter side engaging portion 16 and the outer-diameter side engaging portion 27 becomes a press-fit portion 31a having an interference in the radial direction. A portion of the engagement portion between the inner-diameter side engaging portion 16 and the outer-diameter side engaging portion 27 from the end portion on the one side in the axial direction toward the other end in the axial direction is a clearance fit with a slight gap in the radial direction.

In the present example, the raised portion 45 is provided on the tooth tip portion 44 of the plurality of external teeth 17, and thus the workability of the raised portion 45 and the degree of freedom in the shape thereof are improved.

The other configurations and effects of the seventh example are the same as those of the first and fourth examples.

Eighth Example

Figure 18:
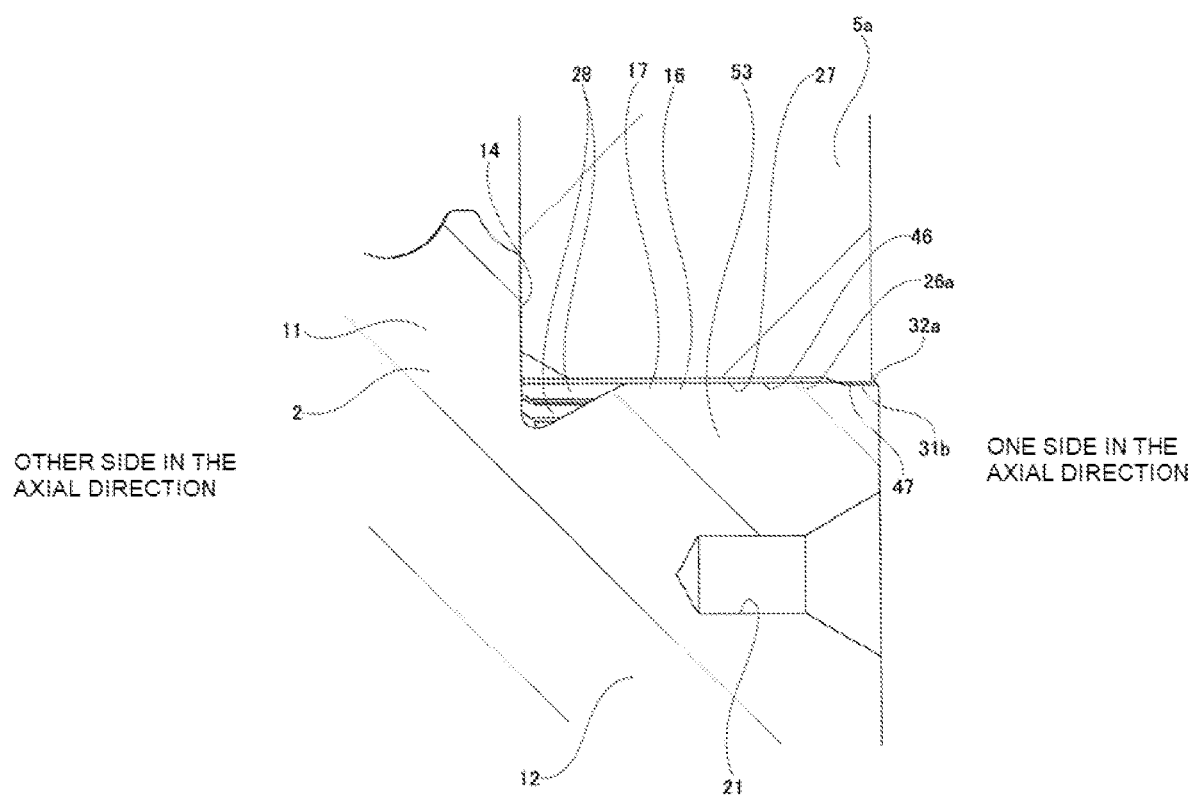
FIG. 18 is a diagram corresponding to FIG. 4 regarding an eighth example of the embodiment according to the present disclosure.

An eighth example of an embodiment according to the present disclosure will be described using FIG. 18.

In the present example, the tooth root circle diameter and the tooth tip circle diameter of the plurality of external teeth 17 are constant in the axial direction. Instead, the tooth root circle diameter of the plurality of internal teeth 28 is not constant in the axial direction, and the tooth root circle diameter of the end portion on the one side in the axial direction, which is one portion in the axial direction, is slightly smaller than the tooth root circle diameter of a portion from an end portion on the other side in the axial direction toward the one side in the axial direction, which is the other portion.

More specifically, the tooth root circle diameter at the end portion on the one side in the axial direction of the plurality of internal teeth 28 is slightly smaller than the tooth tip circle diameter of the plurality of external teeth 17, and the tooth root circle diameter of the plurality of internal teeth 28 at the portion from the end portion on the other side in the axial direction toward the one side in the axial direction of the plurality of internal teeth 28 is slightly larger than the tooth tip circle diameter of the external teeth 17. That is, a raised portion 47 that is slightly raised inward in the radial direction is provided at the end portion on the one side in the axial direction of the tooth root portion 46 of the plurality of internal teeth 28.

In the present example, in a state in which the inner-diameter side engaging portion 16 and the outer-diameter side engaging portion 27 are engaged, interference in the radial direction is formed between the raised portion 47 provided at the end portion on the one side in the axial direction of the tooth root portion 46 of the plurality of internal teeth 28 and the tooth tip surface of the plurality of external teeth 17. Therefore, the end portion on the one side in the axial direction of the engaging portion between the inner-diameter side engaging portion 16 and the outer-diameter side engaging portion 27 becomes a press-fit portion 31b having interference in the radial direction.

That is, the press-fit portion 31b, which is a portion having interference in the radial direction, is arranged at a portion of the engaging part between the inner-diameter side engaging portion 16 and the outer-diameter side engaging portion 27 that is separated from the crimped portion 32a toward the other side in the axial direction. More specifically, in the present invention, the press-fit portion 31b is arranged at a portion of the engaging portion between the inner-diameter side engaging portion 16 and the outer-diameter side engaging portion 27 adjacent to the other side in the axial direction of the crimped portion 32a. A portion from the end portion on the other side in the axial direction toward the one side in the axial direction of the engagement portion between the inner-diameter side engaging portion 16 and the outer-diameter side engaging portion 27 is a clearance fit with a small gap in the radial direction.

In the present example, the raised portion 47 is not formed on the inner-diameter side engaging portion 16 of the screw shaft 2, but is formed on the outer-diameter side engaging portion 27 of the fitting member 5a, and thus the tooth root circle diameter and the tooth tip circle diameter of the external teeth 17 can be made constant in the axial direction. Therefore, the processing cost of the screw shaft 2 can be reduced. In addition, the raised portion 47 is provided at the end portion on the one side in the axial direction of the plurality of internal teeth 28, and thus the workability of inserting the fitting shaft portion 12 into the mounting hole 26a is improved.

However, the raised portion 47 of the plurality of internal teeth 28 may be located at a position separated in the axial direction from a crimped portion provided on at least one of the plurality of external teeth 17, or in other words, may be provided at an end portion on the other side in the axial direction of an inner-diameter side engaging portion.

The other configurations and effects of the eighth example are the same as those of the first and fourth examples.

Ninth Example

Figure 19:
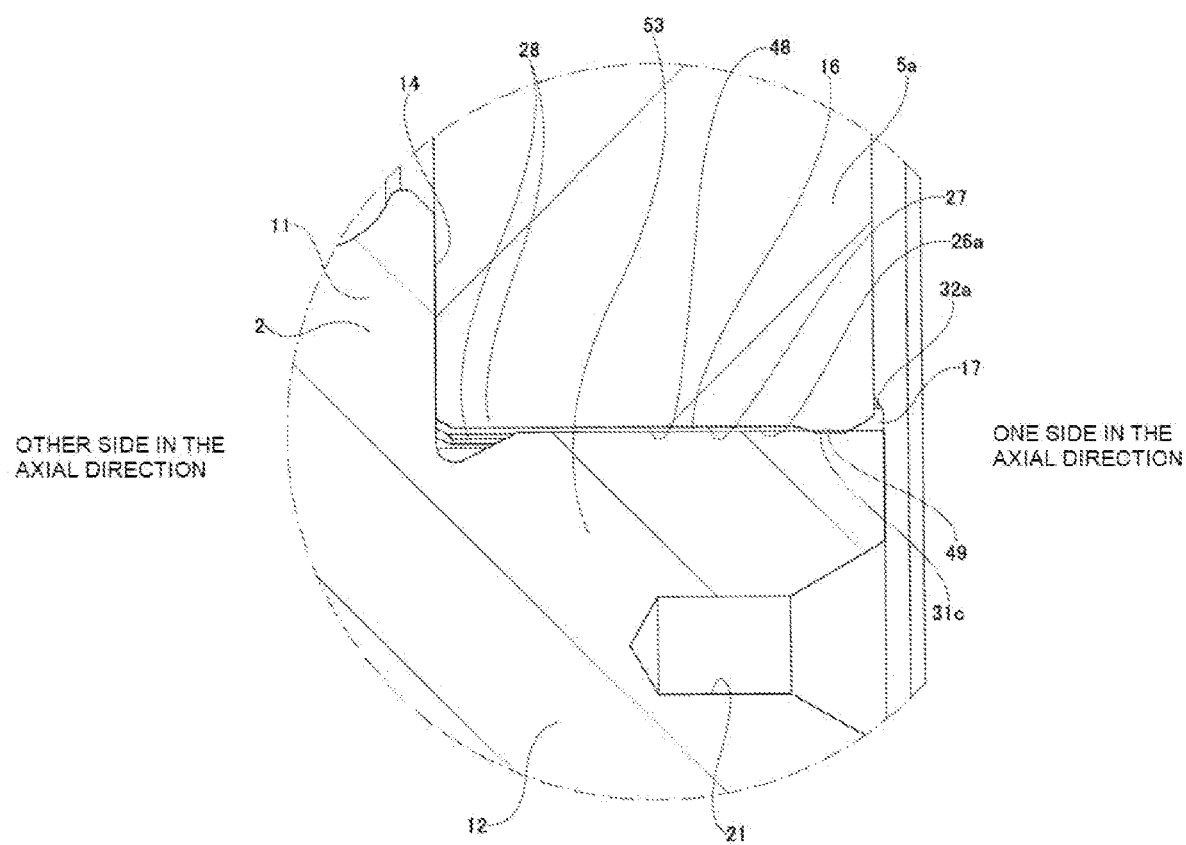
FIG. 19 is a diagram corresponding to FIG. 4 regarding a ninth example of the embodiment according to the present disclosure.

A ninth example of an embodiment according to the present disclosure will be described using FIG. 19.

In the present example, the tooth root circle diameter of the plurality of internal teeth 28 is constant in the axial direction. Instead, the tooth tip circle diameter of the plurality of internal teeth 28 is not constant in the axial direction, and the tooth tip circle diameter at the end portion on the one side in the axial direction, which is one portion in the axial direction, is slightly smaller than the tooth tip circle diameter of the portion from the end portion on the other side in the axial direction toward the one side in the axial direction, which is the other portion.

More specifically, the tooth tip circle diameter at the end portion on the one side in the axial direction of the plurality of internal teeth 28 is slightly smaller than the tooth root circle diameter of the plurality of external teeth 17, and the tooth tip circle diameter of the plurality of internal teeth 28 at the portion from the end portion on the other side in the axial direction toward the one side in the axial direction of the plurality of internal teeth 28 is slightly larger than the tooth root circle diameter of the plurality of external teeth 17. In other words, a raised portion 49 that is slightly raised toward the inner side in the radial direction is provided at the end portion on the one side in the axial direction of the tooth tip portion 48 of the plurality of internal teeth 28.

In the present example, in a state where the inner-diameter side engaging portion 16 and the outer-diameter side engaging portion 27 are engaged, interference in the radial direction is formed between the raised portion 49 provided at the end portion on the one side in the axial direction of the tooth tip portion 48 of the plurality of internal teeth 28 and the tooth root surface of the plurality of external teeth 17. Therefore, the end portion on the one side in the axial direction of the engaging portion between the inner-diameter side engaging portion 16 and the outer-diameter side engaging portion 27 becomes a press-fit portion 31c having an interference in the radial direction. A portion from the end portion on the other side in the axial direction toward the one side in the axial direction of the engagement portion between the inner-diameter side engaging portion 16 and the outer-diameter side engaging portion 27 is a clearance fit with a small gap in the radial direction.

In the present example, the raised portion 49 is provided on the tooth tip portion 48 of the plurality of internal teeth 28, and thus the workability of the raised portion 49 and the degree of freedom in the shape of the raised portion 49 are improved.

The other configurations and effects of the ninth example are the same as those of the first, fourth and eighth examples.

Tenth Example

Figure 20:
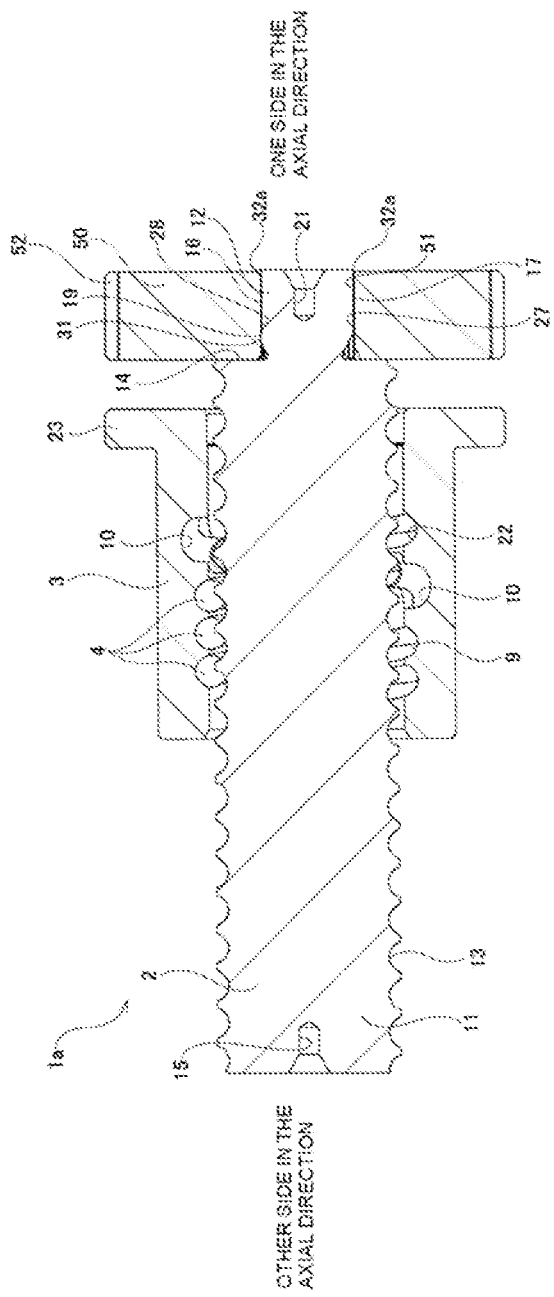
FIG. 20 is a cross-sectional view of a ball screw device according to a tenth example of an embodiment according to the present disclosure.
Figure 21:
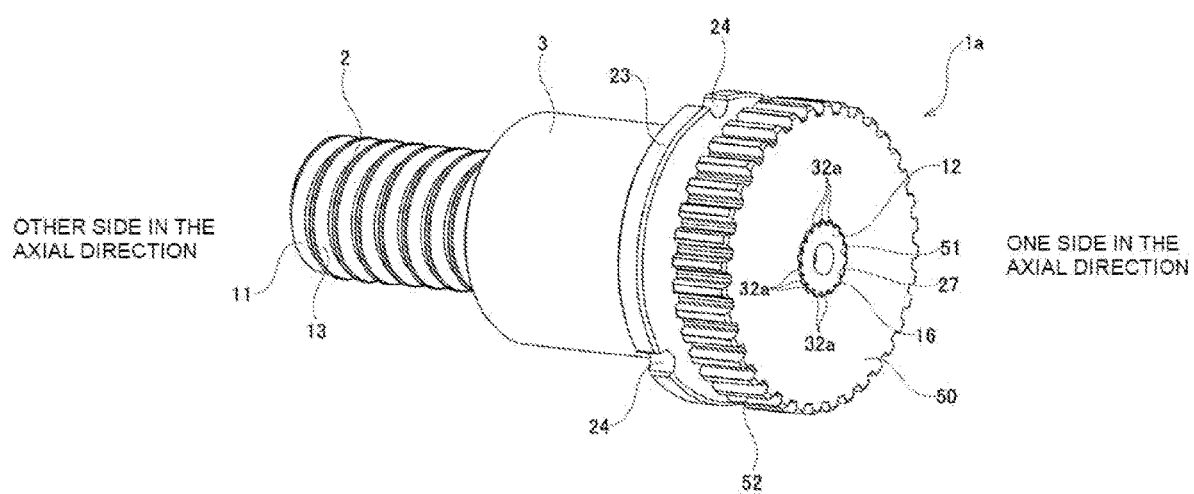
FIG. 21 is a diagram corresponding to FIG. 10 regarding the tenth example.
Figure 22:
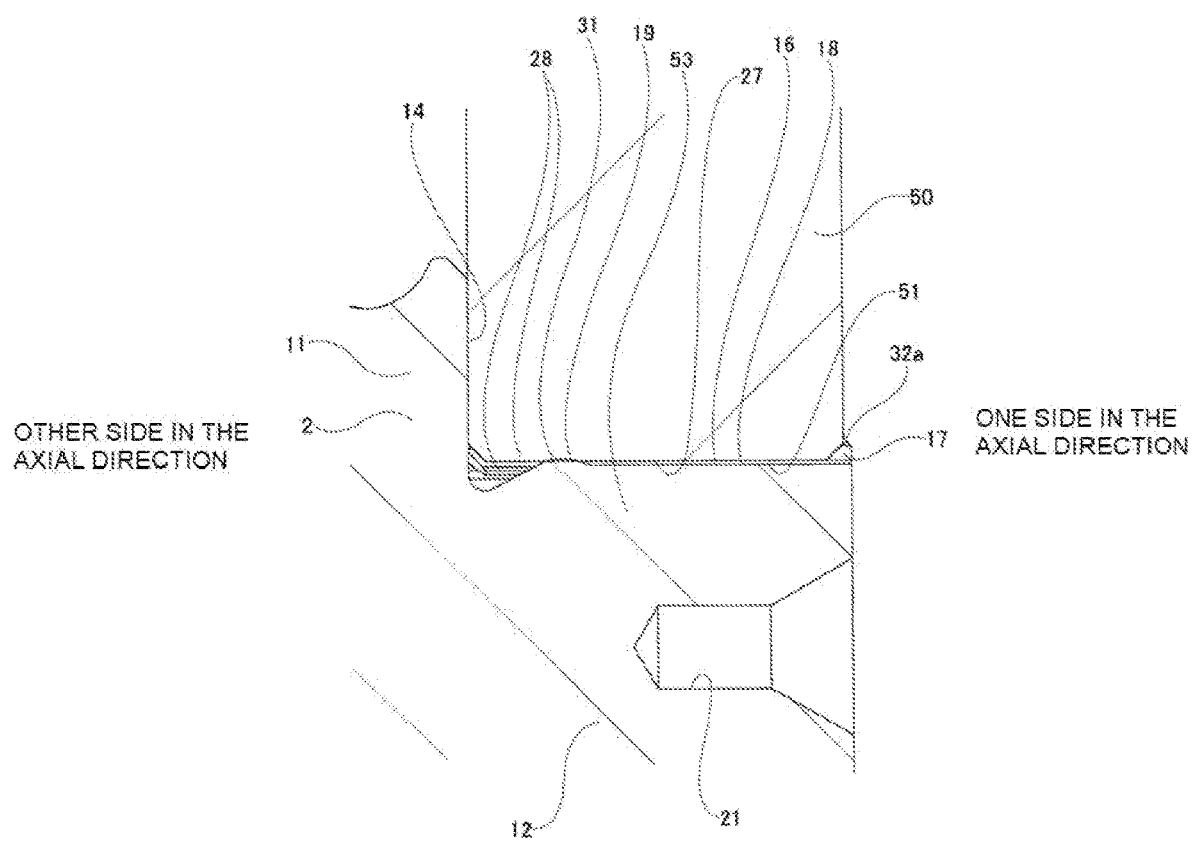
FIG. 22 is a diagram corresponding to FIG. 4 regarding the tenth example.
Figure 23:
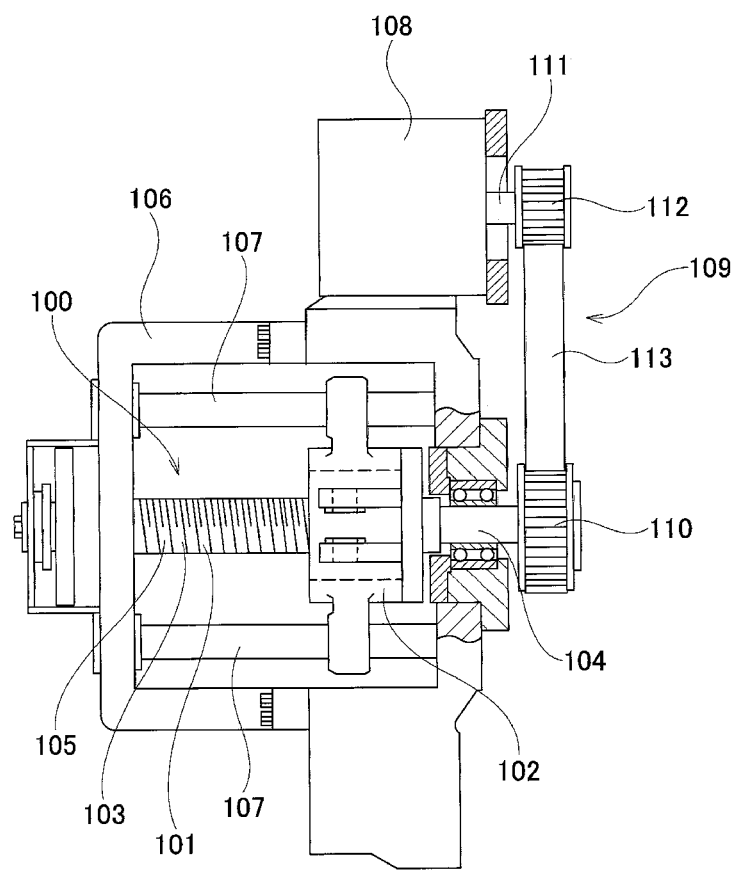
FIG. 23 is a cross-sectional view illustrating a structure in which a conventional ball screw device and a pulley device are combined.

A tenth example of an embodiment according to the present disclosure will be described using FIG. 20 to FIG. 22.

In the ball screw device 1a of the present example, the fitting member 50 is configured by a gear.

The gear of the fitting member 50 is a drive member that rotationally drives the screw shaft 2 by transmitting torque input from a drive source through another gear to the screw shaft 2.

In the present example, the fitting member 50 is configured by a spur gear and has a circular flat plate shape. The fitting member 50 has a mounting hole 51 that penetrates in the axial direction in a central portion in the radial direction. The mounting hole 51 has an outer-diameter side engaging portion 27. The fitting member 50 has a symmetrical shape in the axial direction.

A plurality of internal teeth 28 are arranged at equal intervals in the circumferential direction on the inner peripheral surface of the outer-diameter side engaging portion 27. The plurality of internal teeth 28 extend in the entire axial direction of the outer-diameter side engaging portion 27, and the outer-diameter side engaging portion 27 extends in the entire axial direction of the mounting hole 51 of the fitting member 50. The tooth root circle diameter and the tooth tip circle diameter of the plurality of internal teeth 28 are constant in the axial direction.

In the present example as well, the tooth root circle diameter of the plurality of external teeth 17 provided on the outer peripheral surface of the fitting shaft portion 12 of the screw shaft 2 is not constant in the axial direction, and the tooth root circle diameter of the end portion on the other side in the axial direction, which is one portion in the axial direction, is slightly larger than the tooth root circle diameter of the portion from the end portion on the one side in the axial direction toward the other side in the axial direction, which is the other portion.

A tooth portion 52 that meshes with another gear is formed on the outer peripheral surface of the fitting member 50 over the entire circumference.

In the present example as well, the fitting member 50, as in the first example, is externally fitted and fixed to the fitting shaft portion 12, the outer-diameter side engaging portion 27 and the inner-diameter side engaging portion 16 are engaged such that relative rotation is not possible, and the plurality of internal teeth 28 and a plurality of external teeth 17 are engaged with each other.

In addition, in a state in which the inner-diameter side engaging portion 16 and the outer-diameter side engaging portion 27 are engaged, interference in the radial direction is formed between the tooth tip surface of the plurality of internal teeth 28 and the raised portion 19 provided at the end portion on the other side in the axial direction of the tooth root portion 18 of the plurality of external teeth 17. Therefore, the end portion on the other side in the axial direction of the engaging portion between the inner-diameter side engaging portion 16 and the outer-diameter side engaging portion 27 becomes a press-fit portion 31 having interference in the radial direction. A portion from the one end portion in the axial direction toward the other side in the axial direction of the engagement portion between the inner-diameter side engaging portion 16 and the outer-diameter side engaging portion 27 is a clearance fit with a slight gap in the radial direction.

In addition, in a state where the fitting shaft portion 12 is inserted into the mounting hole 51, a crimped portion 32a is formed at an end portion on the one side in the axial direction of at least one of the plurality of external teeth 17. In the present example as well, crimped portions 32a are formed on all of the plurality of external teeth 17, and the plurality of crimped portions 32a are arranged at equal intervals in the circumferential direction.

In the present example as well, the crimped portion 32a is formed by plastically deforming the end portion on the one side in the axial direction of at least one of the plurality of external teeth 17 toward the outer side in the radial direction and toward both sides in the circumferential direction. The crimped portion 32a protrudes from the external teeth 17 to the outer side in the radial direction and to both sides in the circumferential direction.

The crimped portion 32a engages in the axial direction with the inner peripheral edge portion on the one side in the axial direction of the fitting member 50, and is pressed against the inner peripheral edge portion on the one side in the axial direction of the fitting member 50 without any gaps in the axial direction and the radial direction.

In the present example as well, both the crimped portion 32a and the press-fit portion 31 are provided, and thus, for example, in a case where a moment about an axis perpendicular to the center axis is applied to the fitting member 50 by configuring the fitting member 50 with a helical gear, or in a case where a moment about an axis perpendicular to the center axis is applied to the screw shaft 2, the fitting shaft portion 12 of the screw shaft 2 is effectively prevented from coming out from the fitting member 50 in the axial direction.

The other configurations and effects of the tenth example are the same as those of the first and fourth examples.

Although embodiments of the technique according to the present disclosure have been described above, the technique according to the present disclosure is not limited thereto and may be modified as appropriate without departing from the technical idea thereof. In addition, the structures of the embodiments according to the present disclosure may be combined as appropriate, as long as no contradiction occurs.

In the structure of each example of the embodiments according to the present disclosure, male spline teeth are employed as the plurality of external teeth of the inner-diameter side engaging portion, and female spline teeth are employed as the plurality of internal teeth of the outer-diameter side engaging portion; however, in a case of implementing the technique according to the present disclosure, it is also possible to alternatively employ male serration teeth as the plurality of external teeth and employ female serration teeth as the plurality of internal teeth.

In the structure of each example of the embodiments according to the present disclosure, the circulation groove is formed directly on the inner peripheral surface of the nut; however, in a case of implementing the technique according to the present disclosure, the circulation groove may also be formed in a circulation component separate from the nut, and the circulation component may be fixed to the nut. As the circulation component, any type such as a top type, a tube type, an end deflector type, or the like can be used.

In the structure of each example of the embodiments according to the present disclosure, the carrier or gear of the planetary reduction mechanism is used as the fitting member: however, in a case of implementing the technique according to the present disclosure, a gear, a motor output shaft, a pulley, a sprocket, or the like, which functions as a driving member that rotationally drives the screw shaft, may also be used as the fitting member. In addition, a stopper that prevents relative rotation between the nut and the screw shaft by engaging with the nut in the circumferential direction may also be employed as the fitting member. Furthermore, in a case where the nut is used as a rotary motion element and the screw shaft is used for linear motion, a locking member that prevents the screw shaft from co-rotation may be employed as the fitting member.

REFERENCE SIGNS LIST 1, 1a Ball screw device
2, 2a Screw shaft
3, 3a Nut
4 Ball
5, 5a Fitting member
6 Rolling bearing
7 Electric motor
8 Planetary reduction mechanism
9 Load path
10 Circulation groove
11 Thread portion
12 Fitting shaft portion
13 Shaft-side ball screw groove
14 Abutment surface
15 First center hole
16 Inner-diameter side engaging portion
17 External teeth 18, 18a Tooth root portion
19, 19a, 19b Raised portion
20 Chamfered portion
21 Second center hole
22 Nut-side ball screw groove
23 Flange portion
24 Housing
25 Engaging groove
26, 26a Mounting hole
27 Outer-diameter side engaging portion
28 Internal teeth
29 Inner-ring raceway
30 Support hole
31, 31a to 31c Press-fit portion
32, 32a Crimped portion
33, 33a, 33b, 33c Crimping jig
34 Machining surface
35 Outer ring
36 Rolling element
37 Outer-ring raceway
38 Sun gear
39 Planetary gear
40 Ring gear
41 Pinion pin
42 Motor shaft
43 Recessed portion
44 Tooth tip portion
45 Raised portion
46 Tooth root portion
47 Raised portion
48 Tooth tip portion
49 Raised portion
50 Fitting member
51 Mounting hole
52 Tooth portion
53 Cylindrical portion
54 Small-diameter hole portion
55 Large-diameter hole portion
56 Stepped surface
57 Outer-diameter side surface
58 First machining surface
59 Second machining surface
60 Relief groove portion
61 Bent portion
62 Corner R portion
63 Machining surface
64, 64a Blank screw shaft
65, 65a Blank fitting shaft portion
66 Blank cylindrical portion
67 Blank center hole
68 Blank external teeth
69 Blank inner-diameter side engaging portion
100 Ball screw device
101 Screw shaft
102 Nut
103 Thread portion
104 Fitting shaft portion
105 Shaft-side ball screw groove
106 Housing
107 Guide rod
108 Electric motor
109 Pulley device
110 Driven pulley
111 Motor shaft
112 Drive pulley
113 Belt

The invention claimed is:

1. A ball screw device comprising:
a screw shaft having a thread portion having a spiral shaft-side ball screw groove on an outer peripheral surface, and a fitting shaft portion arranged on one side in an axial direction of the thread portion;
a nut having a spiral nut-side ball screw groove on an inner peripheral surface;
a plurality of balls arranged between the shaft-side ball screw groove and the nut-side ball screw groove; and
a fitting member externally fitted onto the fitting shaft such that rotation relative to the fitting shaft portion is not possible;
the fitting shaft portion having an inner-diameter side engaging portion on an outer peripheral surface in which a plurality of external teeth are arranged in a circumferential direction;
the fitting member having an outer-diameter side engaging portion on an inner peripheral surface in which a plurality of internal teeth are arranged in the circumferential direction, the outer-diameter side engaging portion engaging with the inner-diameter side engaging portion;
an engaging portion between the inner-diameter side engaging portion and the outer-diameter side engaging portion including a portion having interference in a radial direction in a portion of the engaging portion in the axial direction; and
the fitting shaft portion having a crimped portion at an end portion on the one side in the axial direction that engages in the axial direction with the fitting member.

2. The ball screw device according to claim 1, wherein the fitting shaft portion includes a center hole that is open at an end surface on the one side in the axial direction, and a cylindrical portion that exists at an outer side in the radial direction of the center hole; and the crimped portion is provided at an end portion on the one side in the axial direction of the cylindrical portion, and is pressed against a side surface on the one side in the axial direction of the fitting member.

3. The ball screw device according to claim 2, wherein the outer peripheral surface of the cylindrical portion is pressed against an inner peripheral surface of the fitting member.

4. The ball screw device according to claim 3, wherein the crimped portion is inclined in a direction toward the one side in the axial direction as going toward the outer side in the radial direction.

5. The ball screw device according to claim 2, wherein the crimped portion is provided around an entire circumference of the end portion on the one side in the axial direction of the fitting shaft portion.

6. The ball screw device according to claim 1, wherein the crimped portion is formed at an end portion on the one side in the axial direction of at least one external tooth of the plurality of external teeth, and engages in the axial direction to an inner circumferential edge portion on the one side in the axial direction of the fitting member.

7. The ball screw device according to claim 6, wherein the crimped portion is configured by a plurality of crimped portions arranged at a plurality of locations in the circumferential direction.

8. The ball screw device according to claim 1, wherein the portion having interference in the radial direction is arranged at a position of the engaging portion separated from the crimped portion toward the other side in the axial direction.

9. The ball screw device according to claim 1, wherein the plurality of external teeth has a portion in the axial direction where a tooth root circle diameter is larger than a tooth root circle diameter of the other portion, or where a tooth tip circle diameter is larger than a tooth tip circle diameter of the other portion.

10. The ball screw device according to claim 1, wherein the plurality of inner teeth has a portion in the axial direction where a tooth root circle diameter is smaller than a tooth root circle diameter of the other portion, or where a tooth tip circle diameter is smaller than a tooth tip circle diameter of the other portion.

11. The ball screw device according to claim 1, wherein the fitting member has a symmetrical shape with respect to the axial direction.

12. A manufacturing method of a ball screw device; the ball screw device being the ball screw device according to claim 2;
the manufacturing method of the ball screw device comprising steps of;
externally fitting a fitting member to a blank fitting shaft portion of a blank screw shaft; the blank screw shaft including a thread portion with a spiral shaft-side ball screw groove on an outer peripheral surface, and the blank fitting shaft portion arranged on the one side in the axial direction of the thread portion; the blank fitting shaft portion including an inner-diameter side engaging portion provided on an outer peripheral surface and having a plurality of outer teeth arranged in the circumferential direction; a blank center hole open on an end surface of the one side in the axial direction; and a blank cylindrical portion existing on an outer side in a radial direction of the blank center hole; and the fitting member including an outer-diameter side fitting portion provided on an inner peripheral surface, having a plurality of internal teeth arranged in the circumferential direction, and configured to engage with the inner-diameter side engaging portion; and
forming a crimped portion by moving a crimping jig relative to the blank screw shaft to the other side in the axial direction, and pressing a machining surface provided on an outer peripheral surface of the crimping jig against an inner peripheral surface of the blank cylindrical portion to plastically deform the blank cylindrical portion toward the outer side in the radial direction;
the machining surface comprising a plurality of conical machining surfaces having generating lines with different inclination angles with respect to a center axis of the crimping jig.

13. The manufacturing method of a ball screw device according to claim 12, wherein
the plurality of machining surfaces include a first machining surface provided at an end portion on the other side in the axial direction of the outer peripheral surface of the crimping jig, and a second machining surface provided at a portion of the outer peripheral surface of the crimping jig located farther on the one side in the axial direction than the first machining surface; and
the inclination angle of the generating line of the second machining surface with respect to the center axis is greater than the inclination angle of the generating line of the first machining surface with respect to the center axis.

14. A manufacturing method of a ball screw device; the ball screw device being the ball screw device according to claim 6;
the manufacturing method of the ball screw device comprising steps of;
externally fitting a blank fitting shaft portion of a blank screw shaft to a fitting member; the blank screw shaft including a thread portion with a spiral shaft-side ball screw groove on an outer peripheral surface, and the blank fitting shaft portion arranged on the one side in the axial direction of the thread portion; the blank fitting shaft portion including a blank inner-diameter side engaging portion provided on an outer peripheral surface and having a plurality of outer teeth arranged in the circumferential direction; and the fitting member including an outer-diameter side fitting portion provided on an inner peripheral surface, having a plurality of internal teeth arranged in the circumferential direction, and configured to engage with the blank inner-diameter side engaging portion; and
forming a crimped portion by displacing a crimping jig relative to the blank screw shaft to the other side in the axial direction, and pressing a machining surface provided on the crimping jig against an end portion on the one side in the axial direction of at least one blank external tooth of the plurality of blank external teeth to plastically deform the end portion on the one side in the axial direction of the at least one blank external tooth to an outer side in the radial direction and to both sides in the circumferential direction.

* * * * *